(12) United States Patent
Macho Cierna et al.

(10) Patent No.: US 10,915,234 B2
(45) Date of Patent: Feb. 9, 2021

(54) RESPONSIVE, VISUAL PRESENTATION OF INFORMATIONAL BRIEFS ON USER REQUESTED TOPICS

(71) Applicant: MOTOROLA MOBILITY LLC, Chicago, IL (US)

(72) Inventors: Dusan Macho Cierna, Arlington Heights, IL (US); John Bang, Chicago, IL (US); Pratik Kamdar, Naperville, IL (US); Rajib Acharya, Vernon Hills, IL (US); Joel Clark, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 540 days.

(21) Appl. No.: 15/170,530

(22) Filed: Jun. 1, 2016

(65) Prior Publication Data
US 2017/0351414 A1 Dec. 7, 2017

(51) Int. Cl.
*G06F 3/0484* (2013.01)
*G06F 1/3287* (2019.01)
(Continued)

(52) U.S. Cl.
CPC ........ *G06F 3/04847* (2013.01); *G06F 1/3231* (2013.01); *G06F 1/3287* (2013.01); *G06F 3/017* (2013.01); *G06F 3/0227* (2013.01); *G06F 3/0482* (2013.01); *G06F 3/04817* (2013.01); *G06F 3/04842* (2013.01); *G10L 17/22* (2013.01); *H04M 1/72522* (2013.01);
(Continued)

(58) Field of Classification Search
CPC .. G06F 3/04847; G06F 1/3287; G06F 3/0481; G06F 3/017; G06F 3/0227; G06F 3/167
See application file for complete search history.

(56) References Cited

U.S. PATENT DOCUMENTS 8,521,531 B1 * 8/2013 Kim ..................... G10L 15/22
704/252
9,619,202 B1 * 4/2017 Weingartner ......... G06F 3/0482
(Continued)

OTHER PUBLICATIONS

Intellectual Property Office (IPO), Application No. GB17085978, Combined Search and Examination Report, dated Oct. 30, 2017.

*Primary Examiner* — Ryan F Pitaro
(74) *Attorney, Agent, or Firm* — Yudell Isidore PLLC

(57) ABSTRACT

A method and electronic device that enables quick presentation of user briefs on the electronic device includes: receiving, at the electronic device, an informational brief (IB) request (IBR) input that includes an identifier of a topic and a trigger that causes the electronic device to open an IB content screen that temporarily presents specific information corresponding to the topic. In response to receipt of the IB input, the method further includes: retrieving the IB content screen, with content that includes at least one of the specific information; presenting the IB content screen on the electronic device; monitoring an elapsed presentation time for the IB content screen on the electronic device; comparing the elapsed presentation time against a time limit allocated for presenting the IB content screen; and in response to expiration of the time limit, closing the IB content screen to return the device to its previous operating state.

20 Claims, 12 Drawing Sheets

(51) Int. Cl.
*H04M 1/725* (2006.01)
*G06F 3/0482* (2013.01)
*G06F 1/3231* (2019.01)
*G06F 3/01* (2006.01)
*G06F 3/02* (2006.01)
*G06F 3/0481* (2013.01)
*G10L 17/22* (2013.01)
*G10L 17/00* (2013.01)
*G10L 15/22* (2006.01)
*G06F 3/16* (2006.01)

(52) U.S. Cl.
CPC .............. *G06F 3/167* (2013.01); *G10L 17/00* (2013.01); *G10L 2015/223* (2013.01); *H04M 2250/12* (2013.01); *H04M 2250/22* (2013.01); *H04M 2250/74* (2013.01); *Y02D 10/00* (2018.01); *Y02D 30/50* (2020.08)

(56) References Cited

U.S. PATENT DOCUMENTS

| | | | | |
|---|---|---|---|---|
| 9,946,454 | B2 * | 4/2018 | Lee | G06F 3/041 |
| 2004/0049787 | A1 * | 3/2004 | Maissel | H04N 5/44543 |
| | | | | 725/46 |
| 2005/0193335 | A1 * | 9/2005 | Dorai | G06F 16/972 |
| | | | | 715/234 |
| 2006/0031782 | A1 * | 2/2006 | Houmura | G06Q 10/107 |
| | | | | 715/808 |
| 2007/0129046 | A1 * | 6/2007 | Soh | H04M 1/23 |
| | | | | 455/403 |
| 2008/0071929 | A1 * | 3/2008 | Motte | H04L 67/20 |
| | | | | 709/246 |
| 2008/0207263 | A1 * | 8/2008 | May | H04M 1/72566 |
| | | | | 455/556.2 |
| 2009/0070708 | A1 * | 3/2009 | Finkelstein | G06Q 10/10 |
| | | | | 715/789 |
| 2009/0083644 | A1 * | 3/2009 | Kimura | G06Q 10/109 |
| | | | | 715/764 |
| 2009/0100340 | A1 * | 4/2009 | Paek | G06F 17/30899 |
| | | | | 715/728 |
| 2009/0293013 | A1 * | 11/2009 | O'Shaugnessy | G06F 3/0485 |
| | | | | 715/810 |
| 2010/0058231 | A1 * | 3/2010 | Duarte | G06F 3/0481 |
| | | | | 715/800 |
| 2010/0107113 | A1 * | 4/2010 | Innes | G06F 9/44505 |
| | | | | 715/779 |
| 2010/0214278 | A1 * | 8/2010 | Miura | G06F 1/3203 |
| | | | | 345/212 |
| 2011/0078570 | A1 * | 3/2011 | Larsen | G16H 10/60 |
| | | | | 715/710 |
| 2011/0211813 | A1 * | 9/2011 | Marks | G06F 17/3089 |
| | | | | 386/297 |
| 2011/0258556 | A1 * | 10/2011 | Kiciman | G06Q 10/10 |
| | | | | 715/751 |
| 2012/0324507 | A1 * | 12/2012 | Weber | H04H 20/38 |
| | | | | 725/37 |
| 2013/0080911 | A1 * | 3/2013 | Klemm | G06F 16/958 |
| | | | | 715/745 |
| 2013/0268865 | A1 * | 10/2013 | Rhim | G06F 3/0484 |
| | | | | 715/751 |
| 2013/0275899 | A1 * | 10/2013 | Schubert | G06F 3/0481 |
| | | | | 715/765 |
| 2014/0026037 | A1 * | 1/2014 | Garb | G06F 16/972 |
| | | | | 715/235 |
| 2014/0218372 | A1 * | 8/2014 | Missig | G06F 3/044 |
| | | | | 345/473 |
| 2014/0365885 | A1 * | 12/2014 | Carson | G06F 3/167 |
| | | | | 715/708 |
| 2015/0012305 | A1 * | 1/2015 | Truskovsky | G06Q 10/02 |
| | | | | 705/5 |
| 2015/0015919 | A1 * | 1/2015 | Anderson | H04N 1/00188 |
| | | | | 358/3.27 |
| 2015/0019957 | A1 * | 1/2015 | Ying | G06F 17/212 |
| | | | | 715/243 |
| 2015/0112684 | A1 * | 4/2015 | Scheffer | G10L 17/14 |
| | | | | 704/257 |
| 2015/0186156 | A1 * | 7/2015 | Brown | G06F 3/04817 |
| | | | | 715/706 |
| 2015/0186517 | A1 * | 7/2015 | Gilad | H04L 51/16 |
| | | | | 707/722 |
| 2015/0279313 | A1 * | 10/2015 | Yasuda | G09G 5/006 |
| | | | | 345/2.3 |
| 2015/0304186 | A1 * | 10/2015 | O'Sullivan | G06F 17/30312 |
| | | | | 709/224 |
| 2015/0338975 | A1 * | 11/2015 | Shima | G06F 3/0412 |
| | | | | 345/173 |
| 2016/0026366 | A1 * | 1/2016 | Luan | G06F 17/248 |
| | | | | 715/747 |
| 2016/0062627 | A1 * | 3/2016 | Katoh | H02J 13/001 |
| | | | | 13/1 |
| 2016/0247324 | A1 * | 8/2016 | Mullins | G06F 3/012 |
| 2016/0249115 | A1 * | 8/2016 | Lincke | H04N 21/8545 |
| 2017/0068423 | A1 * | 3/2017 | Napolitano | G06F 3/04842 |
| 2017/0068513 | A1 * | 3/2017 | Stasior | G06F 3/167 |
| 2017/0068736 | A1 * | 3/2017 | Beckley | G06F 16/9535 |
| 2017/0078428 | A1 * | 3/2017 | Unter Ecker | H04L 12/6418 |
| 2017/0199632 | A1 * | 7/2017 | Ohmura | G06F 3/0482 |
| 2017/0230709 | A1 * | 8/2017 | Van Os | H04N 21/4394 |
| 2017/0235465 | A1 * | 8/2017 | Marin | G06F 3/04847 |
| | | | | 715/716 |
| 2017/0277498 | A1 * | 9/2017 | Wood, Jr. | G06F 3/1423 |
| 2017/0300216 | A1 * | 10/2017 | Helm | G06F 3/04847 |
| 2017/0345418 | A1 * | 11/2017 | Bangalore | G10L 15/183 |
| 2017/0358305 | A1 * | 12/2017 | Kudurshian | G10L 15/22 |
| 2018/0101352 | A1 * | 4/2018 | Choi | G06F 3/1454 |
| 2018/0121060 | A1 * | 5/2018 | Jeong | G06F 3/04842 |

* cited by examiner

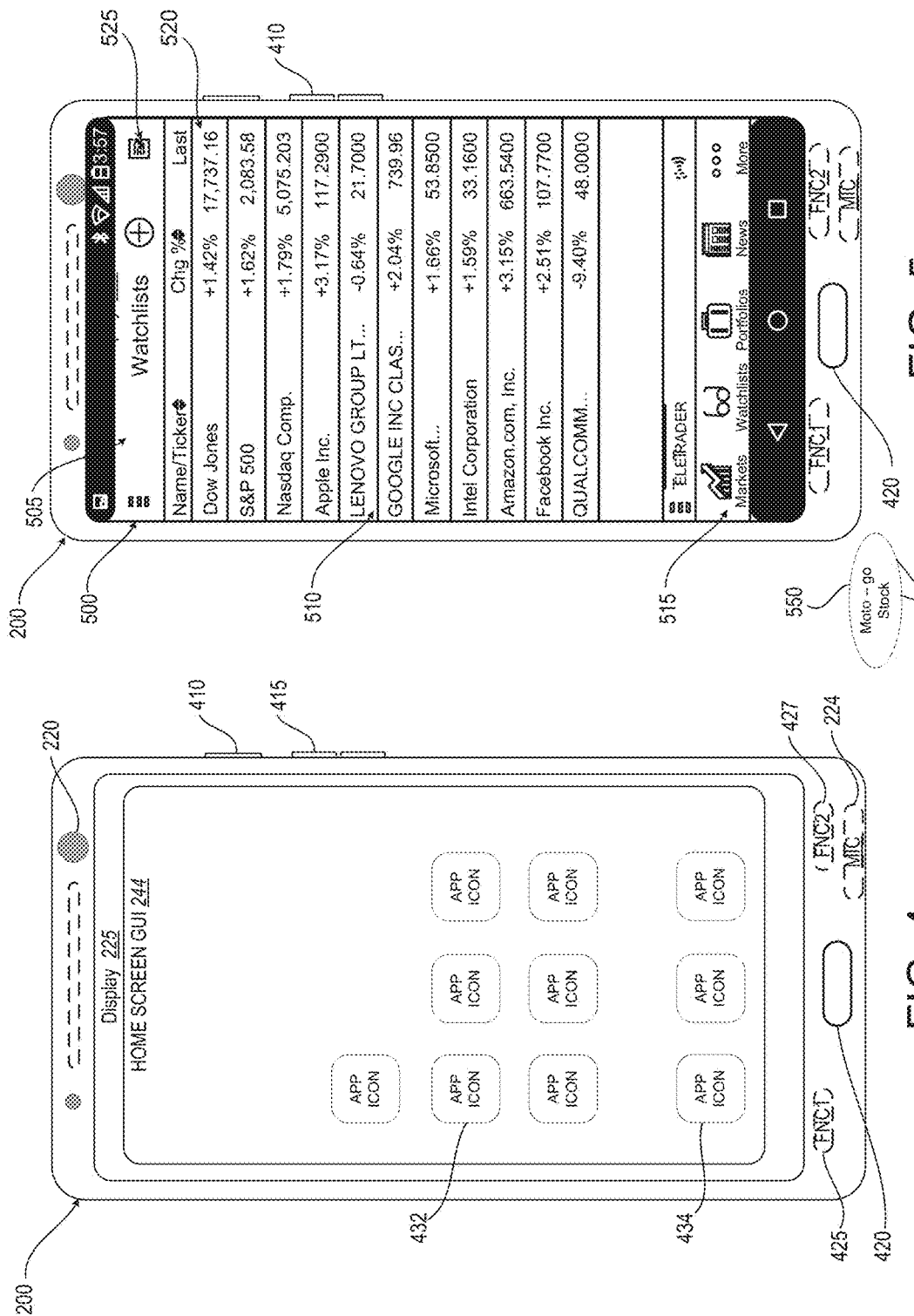

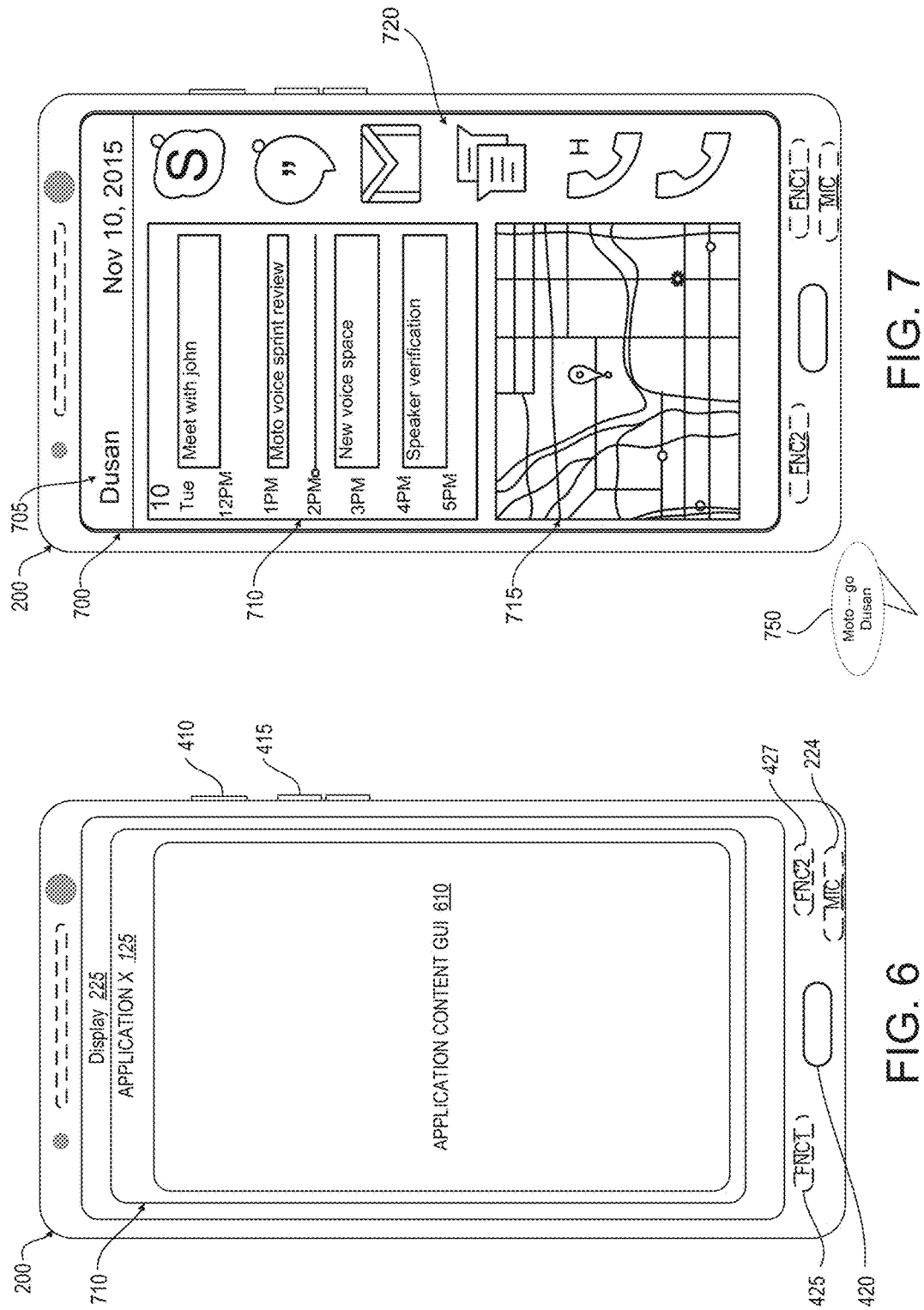

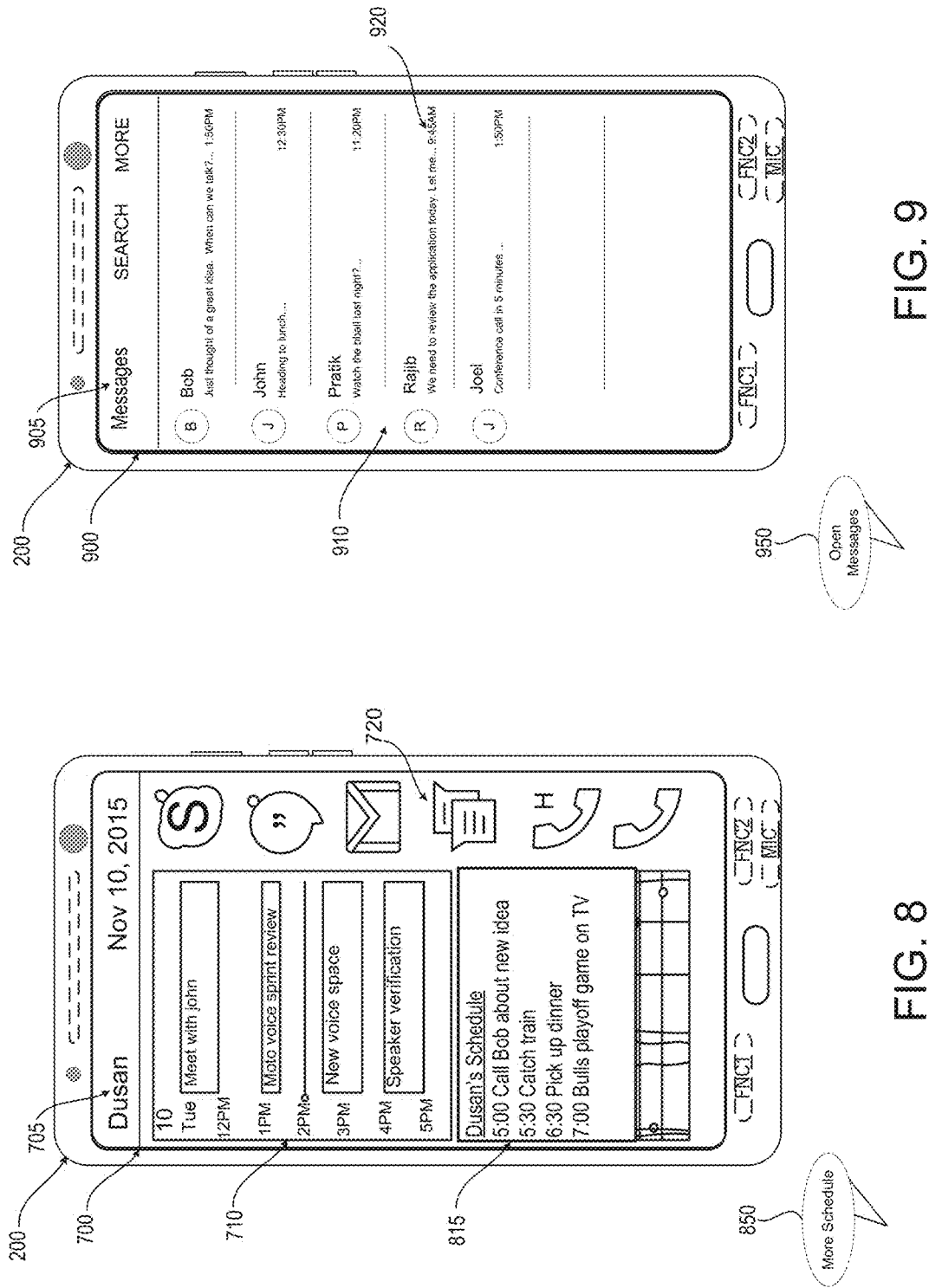

US 10,915,234 B2

RESPONSIVE, VISUAL PRESENTATION OF INFORMATIONAL BRIEFS ON USER REQUESTED TOPICS

BACKGROUND

1. Technical Field

The present disclosure generally relates to electronic devices and in particular to a method for efficiently presenting user-specific information on a display of an electronic device.

2. Description of the Related Art

Personal electronic devices such as smart phones and tablets are becoming ubiquitous. These devices present a host of different information to a user in response to a series of user inputs and/or manipulation of the device through a series of different selection options. In most instances of device usage, the device user has certain specific information that the user accesses periodically and/or which are important for that particular user. Conventionally, the user can make certain selections during setup of his/her device that identifies specific topics that the user is interested in receiving information about within a particular user interface. However, that singular user interface has to be manually opened by the user via a series of manual selections or screen swypes, and the interface and/or information that is presented within the interface cannot be easily modified.

BRIEF DESCRIPTION OF THE DRAWINGS

The disclosure will best be understood by reference to the following detailed description of illustrative embodiments when read in conjunction with the accompanying drawings, wherein:

FIGS. 4 and 5 illustrate an example of mobile device transitioning from a home screen operating/display state to displaying a stock brief in response to a brief activation trigger, in accordance with one or more embodiments;

FIGS. 6 and 7 illustrate another example of mobile device transitioning from an active operating state presenting an application screen to displaying a personalized user brief in response to a specific brief activation trigger, in accordance with one or more embodiments;

FIGS. 8 and 9 illustrates two examples of secondary briefs that can be opened on the device display by user interfacing, via additional verbal inputs, with content presented within the example personalized user brief of FIG. 7, in accordance with one or more embodiments;

DETAILED DESCRIPTION

Figure 1:
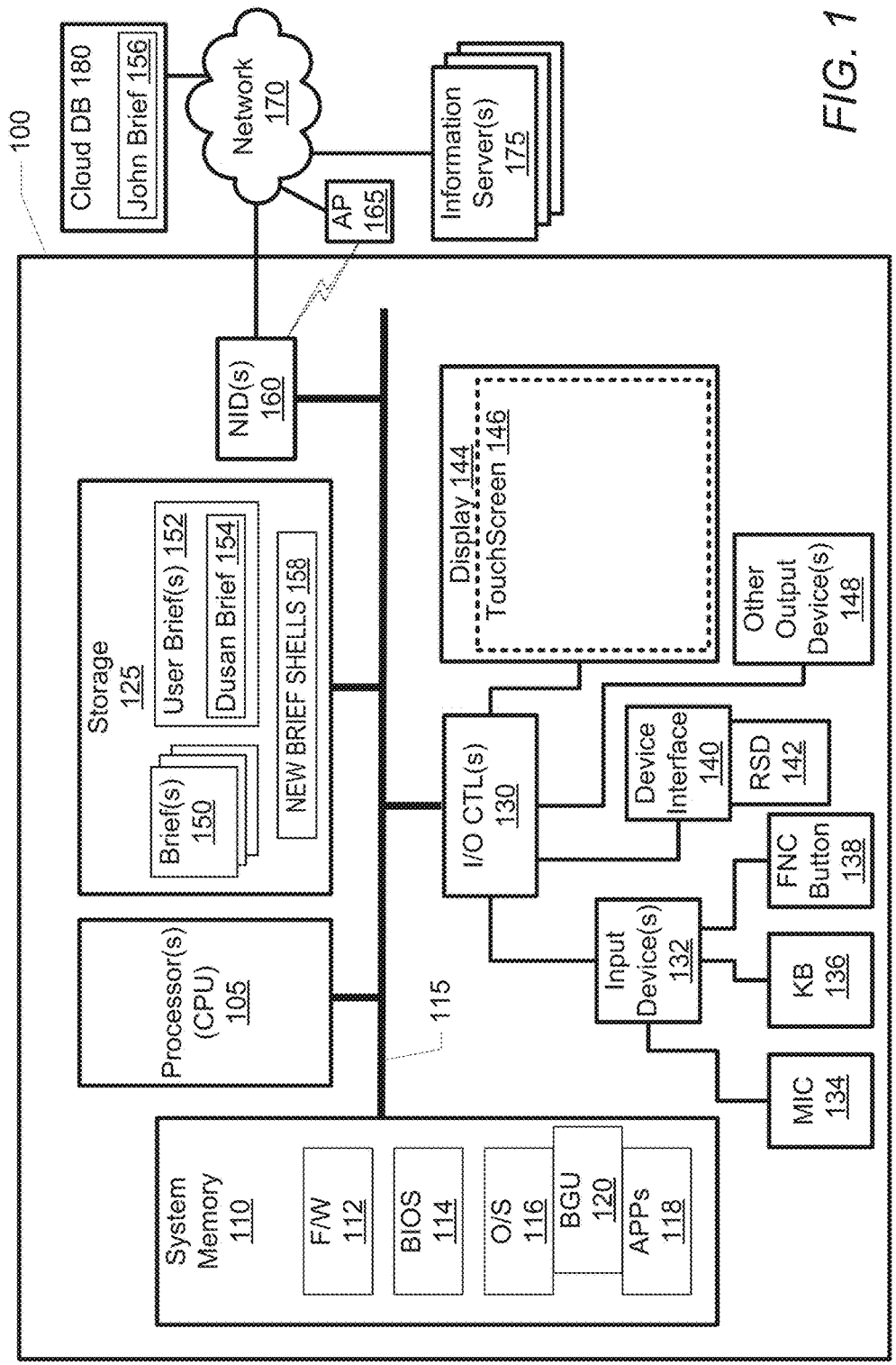
FIG. 1 provides a block diagram representation of an example data processing system within which certain aspects of the disclosure can be practiced, in accordance with one or more embodiments.

The illustrative embodiments provide a method and an electronic device executing a module that facilitates easy display of user information on the device's display without requiring multiple user selections. According to one embodiment, the electronic device includes a memory having stored thereon an informational brief (IB) generation utility (BGU, or more generally an IB utility) that enables generation and management of at least one IB content screen. The device includes at least one input mechanism, which receives an IB request (IBR) input. The IBR input includes (i) an identifier of a topic and (ii) a trigger that causes the electronic device to open an IB content screen that temporarily presents specific information corresponding to the topic. The device also includes a display that provides visual output of at least one graphical user interface (GUI) when the electronic device is in an active (or on) operating state and which is configurable to display IB content screens. The device also includes a processor that is communicatively coupled to the memory, the at least one input mechanism, and the display, and which executes code of the IBCSG utility as program modules that perform specific functions. The processor, in response to receipt of the IBR input, retrieves the IB content screen, with content that includes at least one of the specific topic information. The processor also configures the display to present the IB content screen on the electronic device. As one aspect, the processor monitors an elapsed presentation time for the IB content screen on the electronic device, compares the elapsed presentation time against a time limit allocated for presenting the IB content screen, and in response to expiration of the time limit, closes the IB content screen to return the device to its previous operational state.

The above may contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art, upon examination of the following figures and the remaining detailed, written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within data processing system 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

The description of the illustrative embodiments below can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Also, within the descriptions of the different figures, the use of the same reference numerals and/or symbols in different drawings indicates similar or identical items, and similar elements may have similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In one embodiment, DPS 100 can be any electronic device such as, but not limited to, a desktop computer, notebook computer, mobile phone, smart watch, camera, video recorder, or tablet.

DPS 100 includes at least one processor or central processing unit (CPU) 105 coupled to system memory 110, non-volatile storage 125, and input/output (I/O) controllers 130 via system interconnect 115. System interconnect 115 can be interchangeably referred to as a system bus, in one or more embodiments. One or more software and/or firmware modules can be loaded into system memory 110 (from storage 125 or other source) during operation of DPS 100. Specifically, in the illustrative embodiment, system memory 110 is shown having therein a plurality of common modules, including firmware (F/W) 112, basic input/output system (BIOS) 114, operating system (OS) 116, and application(s) 118. Additionally, system memory 110 includes brief generation utility (BGU) 120. BGU 120 can be provided as one of applications 118 and/or as an executable component within OS 116, in alternate embodiments. The software and/or firmware modules within system memory 110 provide varying functionality when their corresponding program code is executed by CPU 105 or by secondary processing devices within DPS 100.

I/O controllers 130 support connection by and processing of signals from one or more connected input device(s) 132, of which microphone 134, keyboard 136, and function button 138 are illustrated by way of example. It is appreciated that input devices can also include, as a non-exclusive list, a mouse or pointing device, hardware button(s), touch screen 146, infrared (IR) sensor, fingerprint scanner, and the like. I/O controllers 130 also support connection with and forwarding of output signals to one or more connected output devices, including display 144 and other output devices 148. Display 144 can include a touch screen 146 that serves as a tactile input device.

Additionally, in one or more embodiments, one or more device interfaces 140, such as an optical reader, a universal serial bus (USB), a card reader, Personal Computer Memory Card International Association (PCMIA) slot, and/or a high-definition multimedia interface (HDMI), can be associated with DPS 100. Device interface(s) 140 can be utilized to enable data to be read from or stored to corresponding removable storage device(s) (RSD) 142, such as a compact disk (CD), digital video disk (DVD), flash drive, or flash memory card. In one or more embodiments, device interfaces 150 can further include General Purpose I/O interfaces, such as Inter-Integrated Circuit ($I^2C$), System Management Bus (SMBus), and peripheral component interconnect (PCI) buses. In accordance with one embodiment, the functional modules described herein as aspects of the disclosure can be provided as a computer program product. The computer program product includes removable storage device(s) 142 as a computer readable storage medium, on which is stored program code when executed by a processor causes the processor to implement the various functions described herein, including, but not limited to, the features presented in the flow charts of FIGS. 12-14.

DPS 100 further includes network interface device (NID) 160, which can include both wired and wireless networking devices (not specifically shown). NID 160 enables DPS 100 and/or components within DPS 100 to communicate and/or interface with other devices, services, and components that are located external to DPS 100. In one embodiment, DPS 100 may directly connect to one or more of these external devices, via NID 160, such as via a direct wire or wireless connection. In one or more embodiments, DPS 100 connects to specific external devices, services, and/or components, such as information server(s) 175 and Cloud database 180, via external network 170, using one or more communication protocols. Network 170 can be a local area network, wide area network, personal area network, and the like, and the connection to and/or between network 170 and DPS 100 can be wired or wireless (via access point 165) or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

In one or more embodiments, DPS 100 may operate as a wireless communication device and NID 160 may be used to transmit data over a wireless network (e.g., a Wireless Fidelity (Wi-Fi) network, cellular network, Bluetooth® network (including Bluetooth® low energy (BLE) networks), a wireless ad hoc network (WANET), or personal area network (PAN)). In one embodiment, DPS 100 may be further equipped with an infrared (IR) device (not pictured) for communicating with other devices (not shown) using an IR connection. In another embodiment, NID 160 may include a short-range wireless device, including, but not limited to, a near field communication (NFC) device.

As one aspect of the disclosure, BGU 120 executes on CPU 105 to provide executable modules, which perform specific functions, and which utilize and/or generate specific content, which content is stored as information and/or data within storage 125 and/or within cloud database 180. As an example, storage 125 is shown to include Briefs 150, User briefs 152, which includes Dusan brief/data 154, and new brief shells 158. Also, cloud database 180 is shown to include John brief/data 156. Both Dusan brief 154 and John brief 156 represent examples of data/information utilized to generate personalize briefs for two different users, identified as Dusan and John. Additionally, the information presented within Briefs 150 can be information obtained from one or more information servers 175 accessible via the connection through network 170. In one embodiment, information servers 175 include website servers that provide specific information about specific topics for which data can be obtained and presented within Briefs 150.

Figure 2:
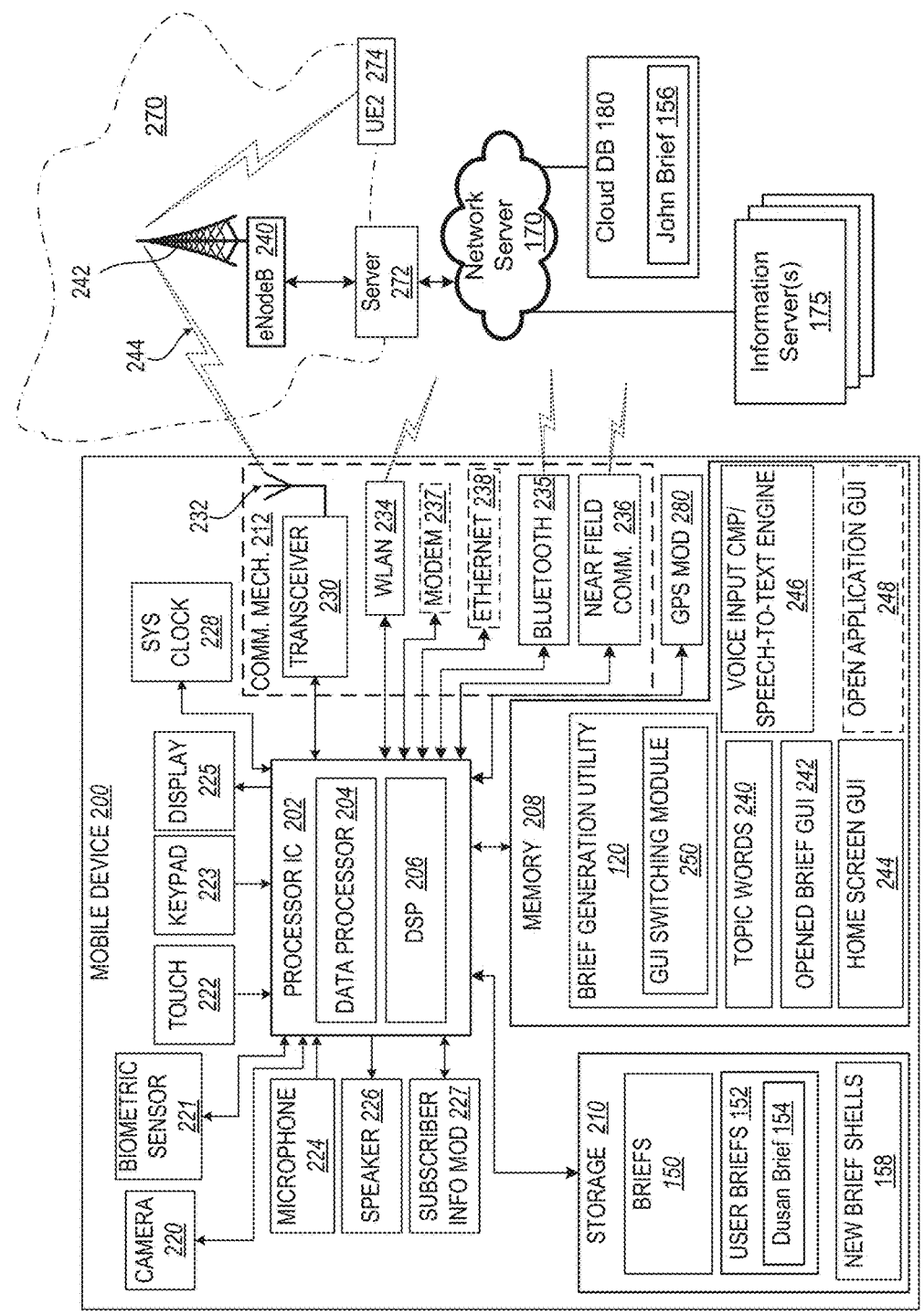
FIG. 2 provides a component-level block diagram representation of an example mobile device within which certain aspects of the disclosure can be practiced, in accordance with one or more embodiments.

FIG. 2 depicts a block diagram representation of the component makeup of a mobile device operating within a communication network and serving as the electronic device within which the various features of the disclosure can be implemented. According to the general illustration, mobile device 200 is a communication device that is designed to communicate with other devices via one of a wireless communication network 270, generally represented by base station, evolution node B (eNodeB) 240 and antenna 242. Mobile device 200 can be one of a host of different types of devices, including but not limited to, a mobile cellular phone or smart-phone, a laptop, a net-book, an ultra-book, and/or a tablet computing device. These various devices all provide and/or include the necessary hardware and software to enable wireless-enabled communication between mobile device 200 and a network from which information and/or data required to fill in an information brief can be retrieved. Mobile device 200 includes the hardware and software to support the various wireless or wired communication functions.

Referring now to the specific component makeup and the associated functionality of the presented components, mobile device 200 comprises processor integrated circuit (IC) 202, which connects via a plurality of interconnects (illustrated by the bi-directional arrows) to a plurality of other functional components of mobile device 200. Processor IC 202 include one or more programmable microprocessors, such as data processor 204 and digital signal processor (DSP) 206, which may both be integrated into a single processing device, in some embodiments. Processor IC 202 controls the communication, program code execution, power mode control, time synchronization, and other functions and/or operations of mobile device 200. These functions and/or operations thus include, but are not limited to, application data processing and signal processing.

Connected to processor IC 202 is memory 208, storage 210, and communication mechanisms 212. Memory 208 can include volatile memory and/or non-volatile memory. During device operation, one or more executable applications can be stored within memory for execution by data processor 204. For example, memory 208 is illustrated containing BGU 120, which includes GUI switching module 250. Memory 208 further includes topic words 240, opened brief GUI 242, home screen GUI 244, which provides application icon display on the devices home screens. Memory 208 also includes voice input comparator and/or speech-to-text engine 246, and can optionally include open application GUI 248. The functionality associated with and/or usage of each of the software modules will be described in greater detail within the descriptions which follow. In particular, the functionality associated with and/or provided by BGU 120, GUI switching module 250, and topic words 240 is described in greater detail with the description of FIG. 3 and several of the other figures and flow charts. It is appreciated that the various software modules can be independent modules that communicate with each other via processor execution of respective program code.

Storage 210 can be any type of available storage device capable of storing one or more application software, firmware, and data. It is further appreciated that in one or more alternate embodiments, the device storage can actually be or can include remote storage, such as a cloud storage, and not necessarily be fully integrated within the device itself. As provided, storage 210 contains one or more Briefs 150, which can include, as a subset thereof, user briefs 152, which includes Dusan brief 154, and new brief shells 158. The specific usage and/or functionality associated with these components are described in greater detail in the following descriptions.

Mobile device 200 also comprises a plurality of input/output (I/O) devices, including input devices comprising camera 220, biometric sensor 221, touch screen and/or touch pad 222, keypad 223, and microphone 224, and output devices comprising display 225, speaker 226, and others.

Mobile device 200 can also include a subscriber identification module (SIM) 227, which can provide unique identification information of the subscriber that owns or utilizes mobile device 200, as well as specific contacts and device settings associated with the particular subscriber. In order to allow mobile device 200 to synchronize operations and/or provide time data, mobile device 200 also includes system clock 228.

According to one aspect of the disclosure and as illustrated by FIG. 2, mobile device 200 supports at least one and potentially many forms of wireless, over-the-air communication, which allows mobile device 200 to transmit and receive communication with at least one second device and/or an externally located network. As a device supporting wireless communication, mobile device 200 can be one of and/or be referred to via other names, such as a system, device, subscriber unit, subscriber station, mobile station (MS), mobile, mobile device, remote station, remote terminal, user terminal, terminal, communication device, user agent, cellular telephone, satellite phone, Session Initiation Protocol (SIP) phone, wireless local loop (WLL) station, personal digital assistant (PDA), handheld device having wireless connection capability, or computing device, such as a laptop, tablet, or other processing devices connected to a wireless modem. To support wireless communication, mobile device 200 includes one or more of the following communication components: transceiver 230 with connected antenna 232, wireless LAN module 234, Bluetooth® transceiver 235 and near field communication (NFC) transceiver module 236. As further illustrated, mobile device 200 can also include components for wired communication, such as modem 237 and Ethernet module 238. Collectively, these wireless and wired components provide a communication means or mechanism 212 by which mobile device 200 can communicate with other devices and networks. To enable location-based services within/on the device, mobile device 200 also includes a location service module, with GPS module 280 presented as the example mechanism, without limitation.

As shown, wireless communication can be performed via a standard wireless network 270, which includes a network of base stations, illustrated by evolution Node B (eNodeB) 240 and associated base station antenna 242. A first over-the-air signal 244 is illustrated interconnecting base station antenna 242 with local antenna 232 of mobile device 200. Additionally, communication can be established with the at least one other device over-the-air signal transmission, following the exchange of specific authentication and/or access credentials. The communication between mobile device 200 and the second devices can be via near field communication, Bluetooth, infrared (IR) transmission, and others, without limitation. As a wireless device, mobile device 200 can transmit data over a wireless network (e.g., a Wi-Fi network, cellular network, Bluetooth® network (including Bluetooth® low energy (BLE) networks), a wireless ad hoc network (WANET), or personal area network(PAN)). In one embodiment, mobile device 200 may be further equipped with an infrared (IR) device (not pictured) for communicating with other devices using an IR connection. In another embodiment, mobile device 200 may include a short-range wireless device, including, but not limited to, a near field communication (NFC) device. In still another embodiment, mobile device 200 may communicate with one or more other device(s) using a wired or wireless USB connection.

The above description provides two example electronic devices having the hardware environment within which the various aspects of the disclosure can be implemented. Generally, the disclosure involves the generation and presentation of "briefs" on a user device, where the presentation occurs almost automatically, once triggered, without requiring significant additional user interfacing with the device and/or physical selection of options. As presented herein, a brief can be described as a graphical screen that provides a live, up-to-date summary about a selected target topic. The information presented (about the particular topic) within the brief is intended to be dynamic in nature. According to one important aspect, the brief's screen is displayed for only a short period of time, with the time being pre-determined, such that the previous screen or GUI of the device is automatically returned to without further user action. In one or more embodiments, the length of time can be configurable by the user within the brief's settings screen, which can be made accessible through the device's settings options. Additionally, the time for displaying each brief can be variable depending on the type of information that is being presented by the particular brief screen. For example, a brief showing stock financial information can be automatically timed to remain viewable on the device's display for a longer period than a brief presenting the weather for that day/week.

As one aspect, each brief is invoked by the detection of a brief activation input, which can be a relatively short voice command or, alternatively, a shortcut on Always on Display (AoD), or a combination of both vocal and physical/tactile inputs. As utilized herein, AoD refers generally to a power efficient version of a touch display that is activated automatically when a user's presence is sensed. In one embodiment, a device that supports this functionality is adapted to provide a selectable option (e.g., a displayed icon) that operates as a trigger for opening a brief. The specific brief opened corresponds to the concurrently received, audible input of a brief name. In another embodiment, the device supports an Always Listening mode, in which the device's microphone remains on, even while the device is in an inactive mode (i.e., sleep or low power in which the display is turned off), and the Always Listening functionality brings the device out of the inactive mode to activate a brief on the device's display in response to receiving an audibly-provided trigger input. In one embodiment, brief screens are created for a top "N" selected targets, which the user selects from a list of available briefs. It is expected that the selected briefs would be around topics that the user expects to be querying periodically, e.g., on a daily basis or several times a day. As one aspect, the brief functionality remains in an always-active/on mode, such that each brief can be audibly requested by a user of the device at any time, both when the device's display screen is ON and OFF, and regardless of whether the device is actively displaying a GUI of an application.

Referring to both FIGS. 1-2, the disclosure provides a device 100/200 that has: a memory having stored thereon an information brief (IB) generation utility (or BGU) 120 that enables generation and management of at least one IB content screen; and at least one input mechanism (e.g., microphone 134) that receives an IB request (IBR) input, which includes an identifier of a topic (topic word) and a trigger that causes the electronic device to open an IB content screen that temporarily presents specific information corresponding to the topic. The device 100/200 further includes display 144/225 that provides visual output of at least one graphical user interface (GUI) when the electronic device is in an operating state. The display 144/225 is configurable to display IB content screens. The device 100/200 also includes a processor 105/204 that is communicatively coupled to the memory, the at least one input mechanism, and the display, and which executes code of the IBSG utility. The processor 105/204, in response to receipt of the IB input: retrieves the IB content screen, with content that includes at least one of the specific information; and configures the display to present the IB content screen on the electronic device. The processor 105/204 also monitors an elapsed presentation time for the IB content screen on the electronic device. The processor 105/204 compares the elapsed presentation time against a time limit allocated for presenting the IB content screen, and in response to expiration of the time limit, closes the IB content screen, and returns the device to the initial operating state from before the opening of the information brief.

According to one embodiment, the at least one input mechanism includes microphone 134/224, and the IBR input includes a voice command that is audibly received via the microphone 134/224 and forwarded to the processor (voice input comparator 246) for voice analysis. The voice analysis can include a comparison of the received audio input with pre-recorded inputs to obtain a match. A match of the voice input to the pre-recorded inputs identifies the specific brief that is to be displayed on the device's display screen. In another embodiment, the voice analysis can include converting the audio input to text via speech-to-text engine 246 and then performing the comparison with the text resulting from the audio conversion. It is appreciated that BGU 120 performs the comparison with only the topic words, where the audibly-received brief trigger is utilized solely to initiate the search for the particular topic word that follows the trigger. As introduced above and illustrated by FIG. 4, the at least one input mechanism includes at least one of: (i) a physical button on the electronic device; (ii) a tactile interface of the electronic device; and (iii) a sensor that detects gestures within proximity to the electronic device. Thus, a brief can be invoked by one of: (i) a short voice command (including a trigger+targettopic); (ii) pressing/selecting a "brief" button on AoD+ and saying the target topic; and (iii) pressing/selecting a brief topic button on AoD (providing a shortcut to the topic).

As illustrated by FIGS. 4-12 (described hereafter), the trigger can include a very short voice command or an AoD touch. In response to this input, the processor retrieves and presents a comprehensive visual answer utilizing the entire screen. According to one aspect, utilization of the brief generation functionality provides an unobtrusive mechanism for presenting specific user-desired information, on demand, and in real time. Briefs are thus not randomly generated (i.e., there are no random popup of messages or notifications) and less background processing is required. According to one aspect, the briefs can be displayed on AoD (where the request is made when the display is turned off) or on a regular display mode (where the display is already on). According to one other aspect, the user is able to interact with the brief by touch, ultrasound/IR gestures, or voice commands, while the brief is being displayed on the device.

According to one aspect, the disclosure supports the creation and use of a number of standard user briefs and additional numbers of personalized briefs on a single user device. For example, in addition to those specifically presented herein, examples of possible briefs, as identified by their topic words, can include, but are not limited to: My Commute (presenting information about delays, alerts, and traffic for my car, train, or bus commute); My News (providing latest news, e.g. World News, Tech News, Finance, and other news); My People (providing a list of top N people with abbreviated contact and status info); What's Up (presenting a summary of communications such as text, calls, emails); My Food (Displaying today's menu in my restaurants); My Fitness (tracking how many steps so far, and other fitness aspects (calories, heart rate)); User Defined Brief (Providing a tool for the user to define his own brief). According to one aspect, briefs can be generated by software designer and provide preset/fixed content, based on some determinable condition, such as location of the device. According to one aspect, certain contextual briefs such as weather brief or stock brief utilize a minimum of contextual information (location) and also can utilize one source (e.g., weather.com) for updating the underlying target information.

According to another aspect, a pre-designed brief can support certain limited user design changes or additions. With these personalized briefs, the user is only minimally involved in the design changes/additions. Stock brief 500 of FIG. 5 presents an example of a partially-personalized brief, where the layout and types of content are pre-determined. The user then selects which specific stocks the user wants included within the pre-formatted brief template. For example, with stock brief 500 (FIG. 5), the user is able to select specific stock tickers or location. These partially-personalized briefs can be created in direct or indirect collaboration with the provider of the underlying target data.

According to another aspect, a brief template is presented for full user modification. In this embodiment, BGU 120 (FIGS. 1, 2) provides a development tool for the user to define his own brief, including all aspects of the format and presentation thereof. In one embodiment, a user interface provides a series of options and selections that allow the specific template content for that personalized brief to be selected or added in by the user. Personalized brief, Dusan brief 800 (FIG. 8), for example, can be generated from a blank template, where the user then selects each component to include within the brief and a location within the brief for displaying specific content.

In yet another embodiment, even more complex briefs can be created as brief templates. The template content can be filled in an automatic way by collecting contextual info. For example, within a commute brief template, the commute type (e.g., train/car/bus), as well as start/end points and times, can be automatically detected. Pertinent info is updated from the corresponding source, requiring a high level of localization. The correctness of the automatically generated base content can then be confirmed by the user.

Figure 3:
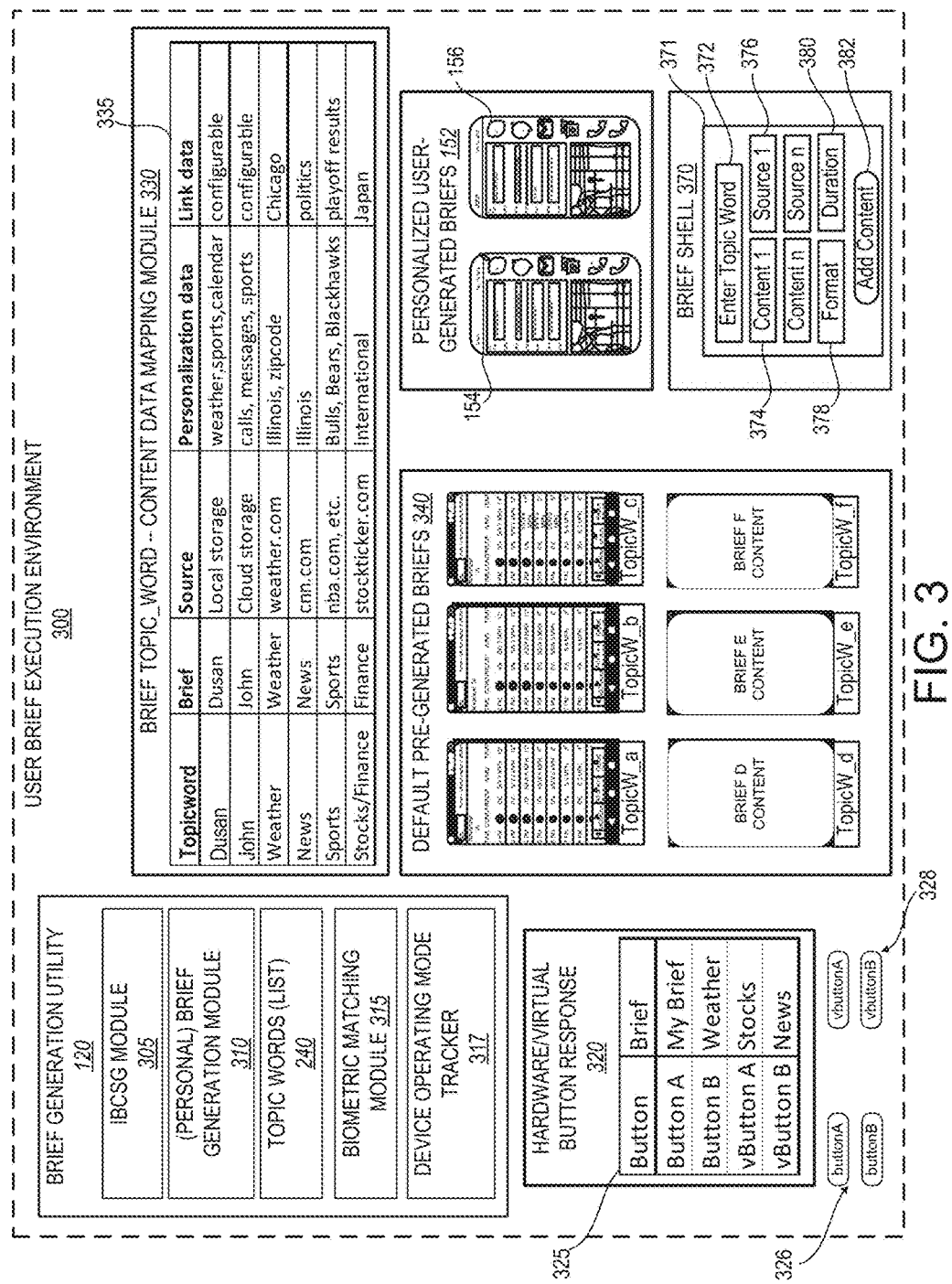
FIG. 3 provides a modular block diagram illustrating functional modules and associated information/data of an example user brief execution environment, in accordance with one or more embodiments.

FIG. 3 presents a block diagram representation of the functional modules that together provide the various aspects of brief generation and use within a BGU execution environment 300. BGU execution environment 300 includes a combination of hardware, firmware, software and data components, which collectively perform the various aspects of the disclosure by execution of BGU 120 and other functional components on/by CPU 105 (FIG. 1) and/or data processor 204 (FIG. 2) and/or other device controllers. As shown, BGU execution environment 300 includes BGU 120, which includes a plurality of executable modules and data. As a representative set of these modules and data, BGU 120 includes IB content screen generation (IBCSG) module 305, personal brief generation module 310, topic words (list) 240, biometric matching module 315, and device operating mode tracker 317.

According to one aspect, device 200 includes at least one of: firmware and an application. The firmware/application executes on the processor to generate a graphical user interface that is presented on the display when the device is in an active state. Device 200 also includes a power saving module that places the electronic device in an inactive state in which a backlight of the display screen is off, such that the device is not currently displaying any user interfaces on the display. With these two possible operating states established, operating mode tracker module 315 then triggers processor 204 to identify a current operational state of the electronic device. The operating state is selected from among (i) an active state in which one of a home screen GUI (see FIG. 4) and an application user interface (see FIG. 6) is presented on the display; and (ii) the inactive state. Then, in response to the device being in the active state when the IBR input is received, the operating mode tracker module 312: opens the IB content screen and overlays the screen on the display; and returns the display to the active state when the IB content screen is closed. However, in response to the device being in the inactive state when the IBR input is received, the operating mode tracker module 312 configures the processor to trigger the backlight to turn on and opens the IB content screen on the display to provide viewability of the content. BGU 120 then triggers the backlight to turn off and return the display to the inactive state when the IB content screen is closed.

BGU execution environment 300 also includes hardware and/or virtual button response module 320, which includes a mapping 325 of specific physical buttons (e.g., Button A and B 326) and virtual buttons (e.g., vButton A and B 328) with associated briefs. In operation, button response module 320 responds to activation of the particular physical or virtual button by opening the associated brief on the device screen.

BGU execution environment 300 further includes mapping module 330, which provides an associative mapping (presented as a table 335) of brief Topic words and the corresponding content data and/or associated information. Each row of associative mapping 335 links specific unique topic word with the associated brief. Further, several later columns include an identification of the source of the brief information, personalization data for the particular brief (i.e., selections made by the user that modifies the default presentation of brief data), and link data, which can be configurable by the user. BGU execution environment 300 further includes a plurality of default pre-generated briefs 340, personalized user-generated briefs 152, and brief shell 370. Each default pre-generated brief 340 includes an associated topic word that triggers the display of the particular brief. Personalized user-generated briefs 152 includes example briefs 154 and 156, which also includes a unique topic word to trigger the display of the brief.

Brief shell 370 includes settings page 371 presenting a plurality of locations for receipt/entry of required brief setup information, including topic word 372 and content 374 and source 376. In one embodiment, the content selection can be pre-programmed to include a list of possible selections that can be added (e.g., via a drop down list). In one or more embodiment, a generalized, default format of the personalized brief can also be determined by the user. Settings page 371 thus includes format selection option 378 that provides a list of multiple available formats that can selected during brief setup by the user. A default format can be provided in the event the user fails to select a specific format. In one embodiment, settings page 371 includes a duration option 380 that allows the user to select a time duration for display of the brief on the device screen. A pre-established range of times can be provided for selection therefrom. Settings page 371 also includes add content button 382 for adding additional entries of content for display within personalized brief. In another embodiment, the user can define the specific content that the user desires to be included within the brief, rather than select from within an available content list. Once a user completes the required entries and selects a format (or maintains the default format), BGU 120 completes the generation of the brief and presents the brief to the user for review on the display screen. The user then accepts the brief as presented or can further modify the brief. A final version of the brief is automatically stored in the local storage for later access. Remote storage of the user-generated personalized brief can also be made to cloud storage or other remote storage.

Referring now to FIGS. 4-5, and 6-7, there are illustrated a series of front, display-side view of an example electronic mobile device, presented as mobile device 200. These different front views are utilize to further define the visual aspects of the execution environment and to present example Briefs in response to specific triggers (topic words) from a first operating state of mobile device 200, according to a plurality of embodiments. As shown by FIGS. 4 and 6, mobile device 200 includes exterior casing/face and a frontal view of a plurality of functional components, such as, camera 220 and display 225. Mobile device 200 includes physical/hardware buttons for user selection, including power button 410 and volume control buttons 415. The physical buttons are selectable buttons, which can be used to receive pre-set manual input from a user to control specific operations of mobile device 200 and/or of applications executing thereon. In one embodiment, physical buttons may also include, or may be connected to, one or more sensors (e.g. a fingerprint scanner or biometric sensor) and/or be pressure sensitive. Physical buttons may also be directly associated with one or more functions of the GUI and/or functions of an OS, application, or hardware of mobile device 200. In a different configuration of electronic device, hardware buttons may include a keyboard (not shown). Mobile device 200 also includes home button 420 located at the bottom of the device. Home button 420 is an example of a physical button that can be pressure or touch sensitive. In at least one embodiment, mobile device 200 can include a plurality of virtual buttons or affordances that operate in addition to or in lieu of hardware buttons. For example, mobile device 200 can be equipped with a touch screen interface and provide virtual buttons or other virtual icons for user interfacing therewith. In at least one embodiment, these virtual buttons can be utilized as a trigger to open specific pre-programmed user briefs on mobile device, when the device is in an active state displaying the home screen, or when the device is in an inactive state with AoD or Always Listening functionality on, for example. As shown, mobile device 200 includes first function button 425 and second function button 427, respectively represented as FNC1 and FNC2. Both the physical buttons and virtual buttons may also be directly associated with one or more functions of the GUI and/or functions of an OS, application, or hardware of mobile device 200. According to one embodiment, one or more of these buttons can be preprogrammed to be a trigger for activating user brief generation functionality on the device. In this embodiment, detection of a depression of the button contemporaneously with the detection of specific topic words triggers the opening of the corresponding user brief for that topic word. In a different configuration of electronic device, hardware buttons may include a keyboard (not shown), such that the trigger is at least one and potentially several different buttons provided by/on the keyboard.

Embedded within the lower portion of external casing is microphone 224, which detects and receives audible sound, including verbal speech inputs of topic words and other detected speech. According to one embodiment, microphone 224 is always on and/or in active listening mode, while the device is powered on.

According to one aspect, mobile device 200 is maintained in an Always Listening state, such that the device is able to be triggered to retrieve and display a brief from any operating state of the device so long as the device is powered on. Thus, mobile device can be in a sleep or low power operation state in which the display is turned off (i.e., the LED or other illuminating backlight is switched off, rendering the display blank). As illustrated by FIG. 4, mobile device 200 can also be in a home screen state or application icons display mode, in which the display presents a background interface with one of the home screens of the device. Example home screen 244 is a GUI in which is displayed one or more application icons 432 on a swype screen and one or more base application icons 434 on a stationary area of the screen. Application icons 432 and 434 are available for user selection to activate/open a corresponding application or service. As shown by FIG. 6, selection of application icon 432, 434 triggers the opening of the corresponding application, application X 125, which presents application content GUI 610. Mobile device 200 can then be described as being in an open/active application state. Thus for purposes of the disclosure, two initial operating states of mobile device are presented, inactive state (corresponding to low powered state in which the display is off, but the device is powered on) and active state (corresponding to both the home screen state and open application open, with respective GUIs presented on the GUI). According to one aspect of the disclosure, the brief generation and display functionality is enabled from either of these states as the device is configured with Always Listening functionality. Additionally, as one additional aspect of the disclosure, mobile device 200 immediately returns to the previous operating state (e.g., the Home screen state) once the displayed user brief times out and is closed on the display.

Referring to the pairing of FIGS. 4-5 and FIGS. 6-7, mobile device 200 includes at least one of firmware and an application that executes on the processor to generate a graphical user interface that is presented on the display when the device is in an active state. Mobile device 200 can operate in one of multiple operating modes, including a power saving or inactive mode. The power saving mode is controlled by a power saving module that places the electronic device in an inactive state in which the backlight for the display screen is turned off, such that the screen appears blank. While in the inactive or power saving mode, the processor identifies a current operational state of the electronic device. These states are identified from among: (i) an active state in which one or more application user interfaces are being presented on the display; (ii) an active state in which the Home screen interfaces are being presented on the display; and (iii) an inactive state in which the device is not currently displaying any user interfaces on the display. The juxtaposition of FIGS. 4-5 and FIGS. 6-7 illustrate the processor transitioning the device 200 from two different active states in response to receipt of a user brief input trigger. In FIGS. 4-5, mobile device 200 is originally in an active home screen state, in which home screen GUI 244 displays application icons 432, 434 for user selection. While the device is in this operating state, first information brief request (IBR) input 550 is audibly detected by microphone 224. In the presented example, IBR input 550 includes trigger phrase "Moto—go" followed by topic word "stock". The detection of these words spoken in the particular sequence triggers processor 204 to open BGU 120 and perform a search for the brief corresponding to that topic word. Once the brief is identified, the brief and associated content is presented on display 225 of mobile device 200 overlaying (or temporarily replacing) home screen GUI 244. FIG. 5 presents examples of possible content within example stock brief 500. As shown, stock brief 500 includes header or title block 505 with an identifier (Watchlists) presented therein. Stock brief 500 also includes pseudo-static content 510, which includes identifiers of selected stocks that the user may have pre-selected for display within brief 500. To the right of each of these stock identifiers are corresponding stock values 520, which represent variable data, which may be changing. As further shown, stock brief 500 includes selectable options 515 within a bottom section of brief. These selectable options 515 represents sub-categories of content, which provide alternate views within stock brief 500 based on user selection. According to one aspect, user selection of these sub-categories can be received by a tactile/touch input of the specific icon (e.g., markets or portfolios) or an verbal input of the name of the specific option (e.g., "go markets" or "markets") while the stock brief 500 is being displayed. Selection of a different option for display changes the heading identifier 505 and content (510, 520) presented within stock brief 500.

As one aspect of the disclosure, each brief presented on mobile device 200 has a pre-established time limit before the brief is automatically closed and the device returned to its initial operating state (e.g., the home screen GUI for the FIGS. 4-5 transition). In one embodiment, a timer signal can be provided and displayed along with or embedded within the brief to alert or inform the user of the pending closure of the brief. This features allows the user to extend the display time remaining for the brief by interfacing with the brief in some way (via tactile or verbal input). This ability to extend the brief display time may be limited to a single extension or another pre-set number of extensions, in one or more embodiment, with the number of extensions variable (or user settable) based on the specific brief or type of brief being displayed. An example timer 525 is presented within top right corner of stock brief 500. Timer 525 can be an actual time counter or some other form of notification mechanism, without limitation.

As introduced above, a user of device can create personal briefs presenting user selected information in user-selected format. In FIGS. 6-7, mobile device 200 is originally in an active state with content of an application GUI 610 presented on display 225. While the device is in this operating state, second IBR input 750 is audibly detected by microphone 224. In the presented example, IBR input 750 includes trigger phrase "Moto—go" followed by topic word "Dusan". The detection of these words, spoken in the particular sequence, triggers processor 204 to open BGU 120 and perform a search for the brief corresponding to that topic word. Once the brief is identified, the brief and associated content is presented on display 225 of mobile device 200 overlaying (or temporarily replacing) application GUI 610. FIG. 7 presents examples of content within personalized Dusan brief 700. As shown, Dusan brief 700 includes header or title block 705 with the personal identifier (Dusan) presented therein. Dusan brief 700 also includes other pseudo-static categories of content, which includes selected content that the user has pre-selected for display within Dusan brief 700. Within each category is corresponding content that is personalized for the user, based on some personalization criteria provided during setup of the brief. As an example, Dusan brief 700 includes a day schedule 710, which shows a 5 hour window of Dusan's scheduled activities from the time the brief is opened.

According to one embodiment, and as illustrated by FIG. 8, the user can selectively extend the view of the schedule to include a next block of time (e.g., 2 hours) by verbalizing a particular topic word or command while the brief is open on the device. With the example, user can voice the command "more schedule" 850 to trigger the IBU to present an extension 850 of the displayed time schedule by the additional 2 hours, extending the schedule down into the area of the brief below it (i.e., covering or replacing map content 715 of FIG. 7).

Included on the right side of Dusan brief 700 are several selectable icons 720 that identify applications that were selected by the user for inclusion in the brief. These applications can include email, messages, and the like. In one embodiment, as illustrated by FIG. 9, the user can select one of the presented icons via a tactile or vocal selection, which selection triggers the opening of the associated application GUI. In the example of FIG. 9, the user verbalizes the command "open Messages" 950, which triggers text messaging GUI 900 to open on the display in place of the Dusan brief 700. In a first embodiment, Dusan brief 700 can be automatically closed contemporaneously with opening of text messaging GUI 900. Alternatively, in a second embodiment, Dusan brief 700 can be moved to a hidden screen to enable text messaging GUI 900 to be the displayed GUI on the device. Messaging GUI 900 is a standard messaging application GUI that includes text messages 910 and date and time indicia 920 associated with the messages.

Referring again to FIG. 5, as further shown, stock brief 500 includes selectable options 515 within a bottom section of brief. These options provide a subset of different financial data and information (or data/information presented in a different format) within the same stock brief 500. In a related embodiment, the user selectable options 515 provide a separate content screen that is still a part of user brief 500. User may select (via verbal or tactile input) one of the selectable options 515, which triggers a corresponding screen of the user brief 500 to open and be displayed within stock brief 500. Unlike the above embodiment with the messaging application, each of these screens within stock brief 500 present specific information related to stock brief 500. The on-screen display time of stock brief can be a single total time regardless of the number of pages available for selection within the single brief, or can include a pre-assigned extension of additional time for each selection that is detected while the previous page of the brief is still being displayed.

Figures 10, 11:
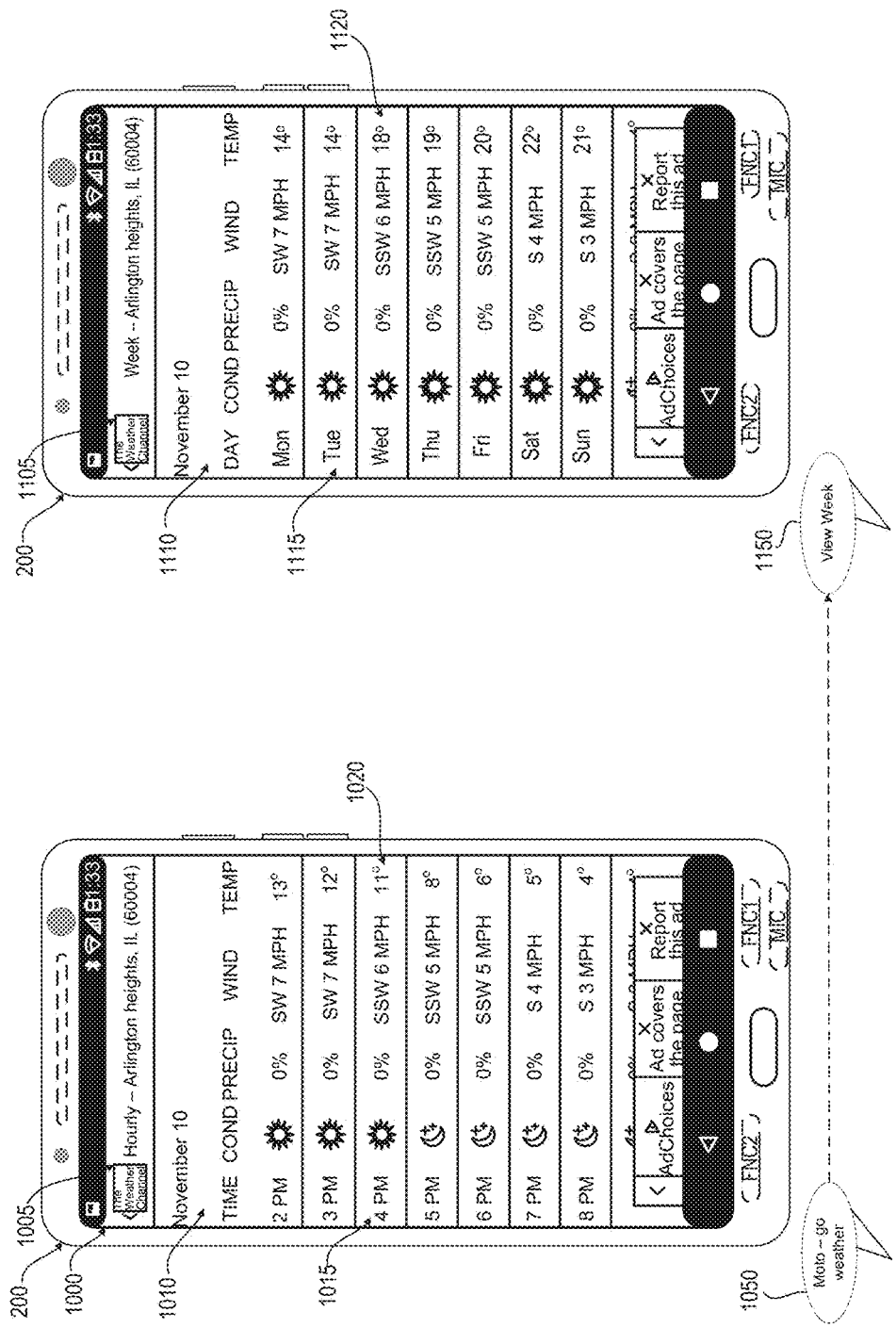
FIGS. 10 and 11 illustrate two views presenting different content within a weather brief, with the second view triggered by receipt of a specific user command while a first view of the brief is opened on the user device, in accordance with one or more embodiments.

FIGS. 10-11 illustrate an example transition from a first content screen 1005 of weather brief 1000 to a second content screen 1105 of a same weather brief 1000 by user entry of a week view command 1150 while the day view (first content screen) is being displayed. Entry of the command can be via a vocal input or a combination of a tactile input (e.g., depression of a specific physical button such as FNC1 button, while voicing the "week view" command 1050). Weather brief 1000 changes from displaying weather conditions for a single day to showing the weather condition for the same location over an entire week.

Figure 12A:
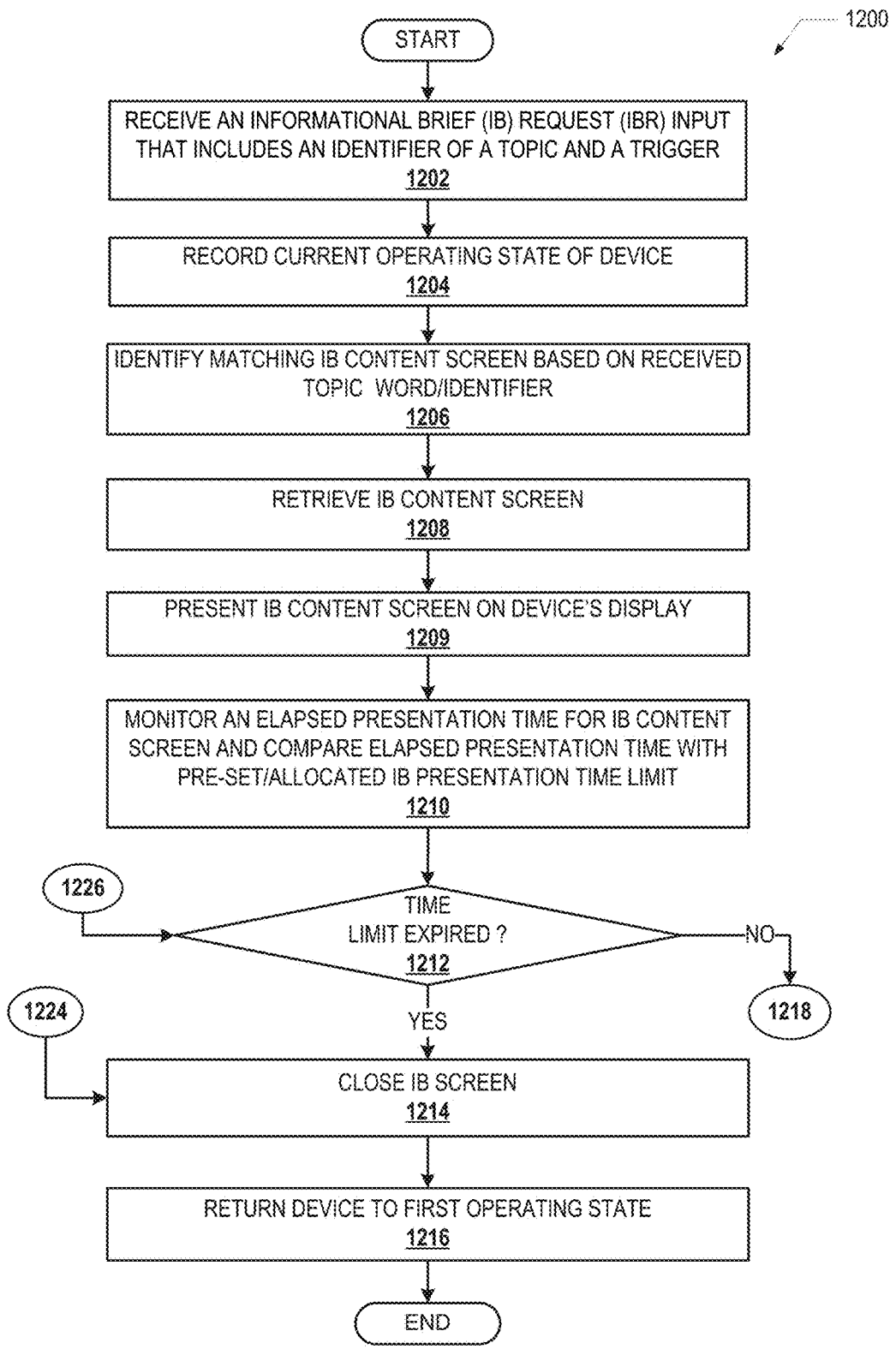
FIG. 12(A-C) is a flow chart illustrating a method for activating and displaying a brief on a display of an electronic device and responding to different types of user interfacing with the brief, in accordance with one or more embodiments.
Figure 12B:
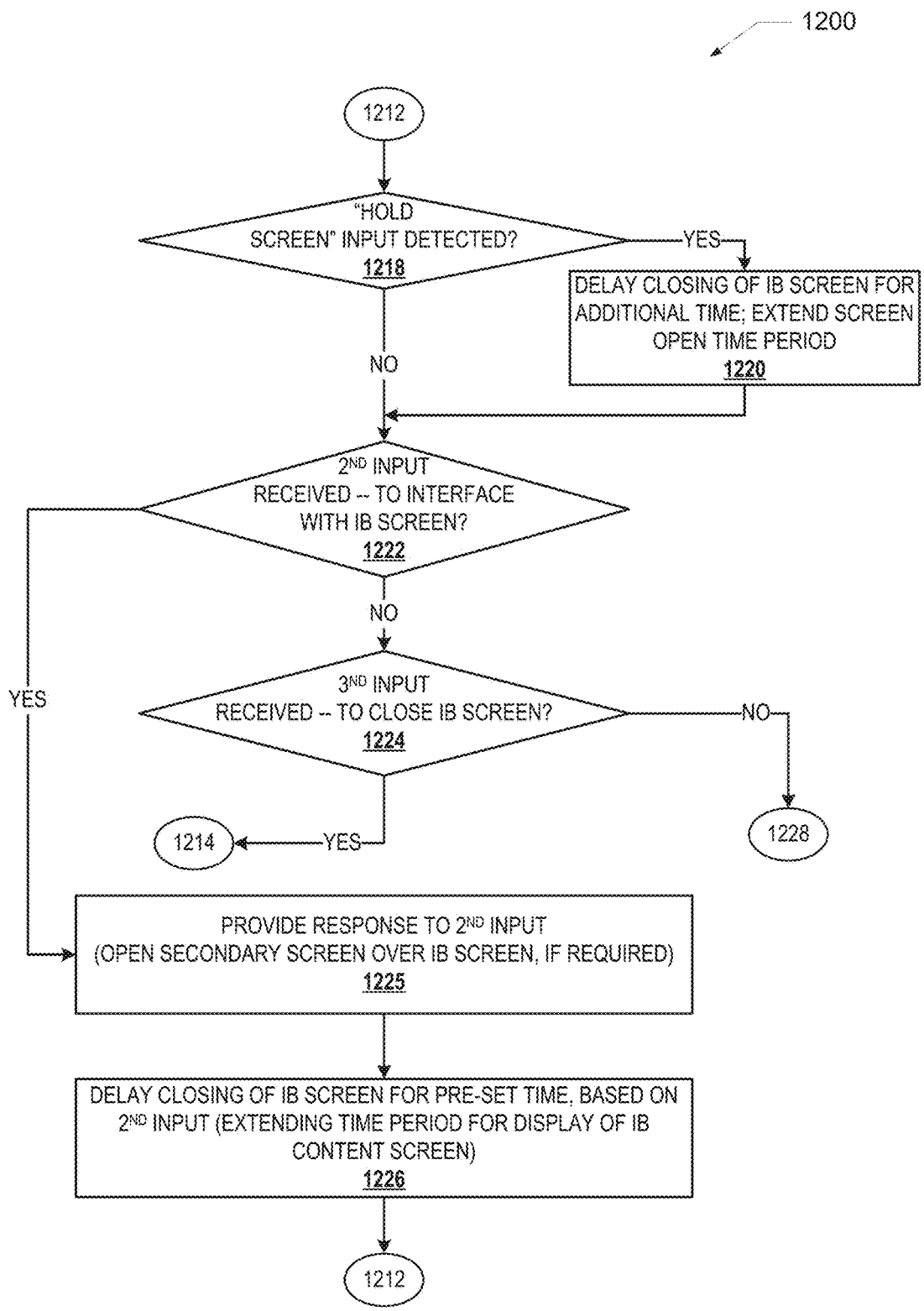
Figure 12C:
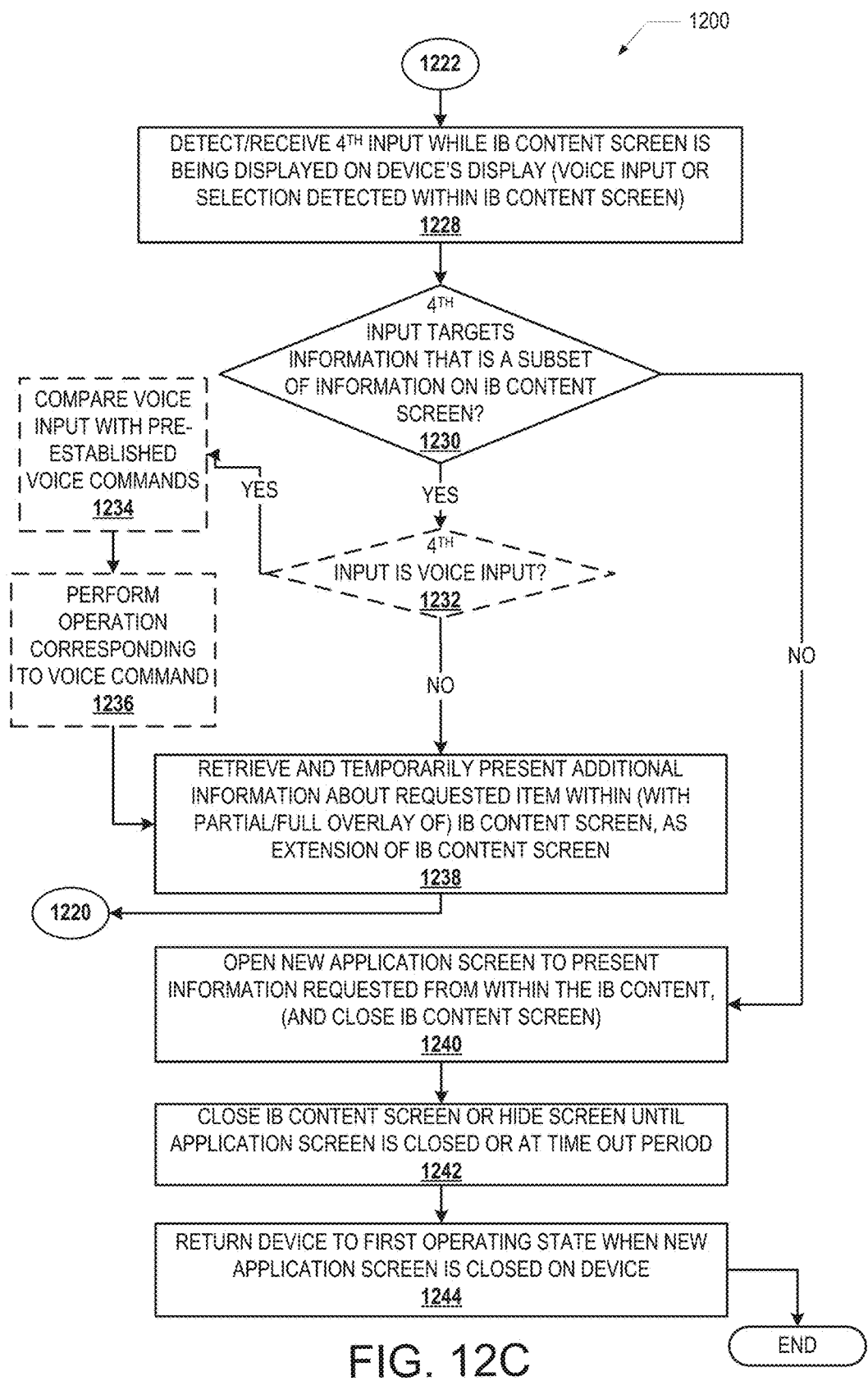
Figure 13:
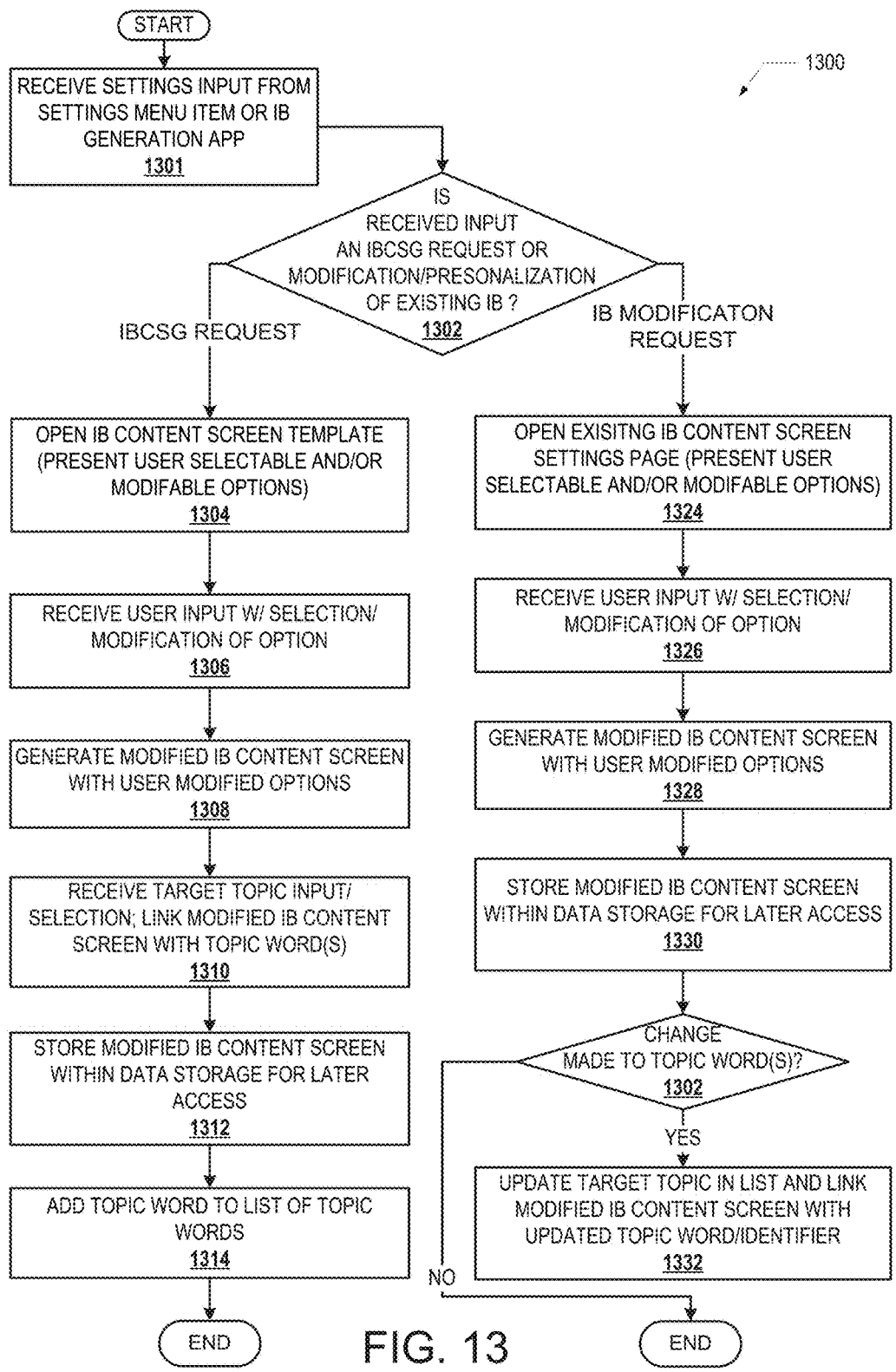
FIG. 13 is a flow chart illustrating a method for personalizing an existing brief and/or configuring a brief shell to generate a personalized user brief, in accordance with a plurality of embodiments.
Figure 14:
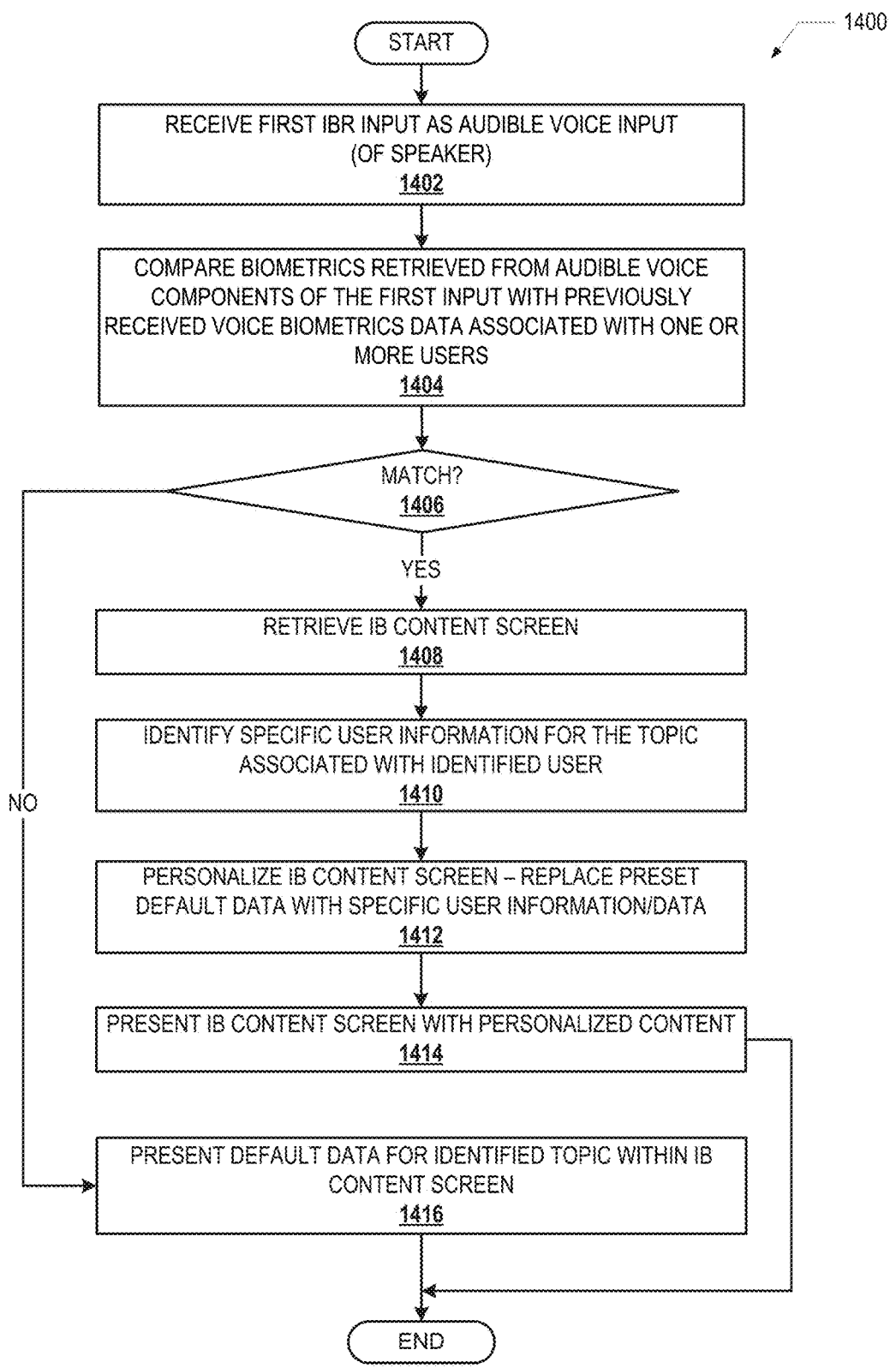
FIG. 14 is a flow chart illustrating a method for generating and/or retrieving a personalized user brief based on biometric matching, in accordance with one or more embodiments.

Referring now to FIGS. 12-14, there are illustrated a number of flow charts presenting various methods for performing specific aspects of the disclosure, according to respective embodiments. Aspects of the various methods are described with reference to the components of FIGS. 1-3, with implementation features illustrated within FIGS. 4-11. Several of the processes of the various methods can be implemented by a processor (e.g., CPU 105 or processor 204) executing software code of certain functional modules/components (see FIG. 3) within BGU 120 within data processing system 100 (FIG. 1) or mobile device 200 (FIG. 2). For cohesiveness in describing features associated with the GUIs and display, the method will be described as being implemented within mobile device 200 via processor 204 and/or functional modules that are executed by processor 204.

In FIG. 12, directional arrows are presented terminating with or starting from a circular block with reference numerals included therein. These directional indicators are utilize to indicate a flow of the method processes from one page to the other across A, B and C pages of FIG. 12. Each of the described inputs can be or can include at least one of (i) a voice command, (ii) a manual selection on the electronic device, and (iii) a gesture detected in proximity to the electronic device.

Beginning first with FIG. 12(A-C), method 1200 commences at start block and proceeds to block 1202 at which the device receives an informational brief (IB) request (IBR) input that includes an identifier of a topic and a trigger that causes the electronic device to open an IB content screen that temporarily presents specific information corresponding to the topic. According to one more embodiments, the trigger comprises at least one of (i) a voice command that is audibly received and (ii) a manual input that is received at the electronic device. The manual input can include one of: (i) a physical depression of a physical button on the electronic device; (ii) a manual selection of a virtual affordance visually represented on a display of the electronic device; and (iii) a specific gesture that is detected in proximity to the electronic device. Additionally, in an alternate embodiment, the manual input includes a manual selection of a topic icon presented on a display of the electronic device.

From block 1202, method 1200 proceeds to block 1204 at which processor 204, in response to receipt of the IBR input: records a current operating state of the device. Processor 204 then identifies a matching IB content screen based on the received topic word (block 1206), then retrieves the IB content screen, with content that includes at least one of the specific information (block 1208) and present the IB content screen on the display of the electronic device (block 1209). Contemporaneously with presenting the IB content screen on the display, processor 204 begins monitoring an elapsed presentation time for the IB content screen on the electronic device and compares the elapsed presentation time against a time limit allocated for presenting the IB content screen (block 1210). At decision block 1212, processor 204 determines whether the time limit has expired. In response to expiration of the time limit, processor 204 closes the IB content screen (1214). Processor 204 automatically returns the electronic device to the first/initial operating state, contemporaneously with the closing of the content screen, where the IBR input was received while the electronic device was in a first operating state.

Returning to block 1212, while the time limit has not expired, method proceeds to block 1218 (FIG. 12B) at which a next determination is made whether a second input has been detected/received while the IB content screen is open on a display of the device and which triggers an extension of the time to present the brief on the display (i.e., a hold screen input) has been detected. In response to receiving the second input while the IB content screen is open, where the second input (or hold event) is one that triggers the extension of the display time for the brief, processor 204 delays the closing of the IB content screen and extends the time period during which the IB content screen remains open on the display of the device (block 1220). According to one or more embodiments, the second input can be at least one of (i) a voice command, (ii) a manual selection on the electronic device, and (iii) a gesture detected in proximity to the electronic device. Following, a next determination is made at block 1222 whether a second input is received for interfacing with the displayed IB screen. Following, a next determination is made (at block 1224) whether a third input is received while the IB content screen is open on a display of the device, where the third input activates a brief closure operation. In response to receiving the third input while the IB content screen is open, method proceeds to block 1214 at which processor automatically closes the IB content screen. In this scenario, the IB content screen is closed before expiration of the time period. According to one or more embodiments, the third input comprises at least one of (i) a voice command, (ii) a manual selection on the electronic device, and (iii) a gesture detected in proximity to the electronic device.

Returning to decision block 1222, in response to receiving a second input, method proceeds to block 1225 at which processor provides a response to the second input. This response can include opening a secondary screen within/or over IB screen, where required. Processor 204 then delays closing of the IB screen for a preset time period, based on the second input (block 1226).

Turning now to FIG. 12C, method includes processor 204 receiving a fourth input while the IB content screen is open on a display of the device (block 1228). At decision block 1230, processor 204 determines whether the $4^{th}$ input targets information that is a subset of information within IB content screen and is received while the IB content screen is open. For example, a specific selectable item can be presented within the IB content screen, and method 1200 further includes processor 204 detecting selection of the specific item within the brief. When the fourth input targets a subset of the IB content screen information, and is received while the IB content screen is open, method includes processor 204 retrieving and temporarily presenting additional information about a specific item within the IB content screen, as an extension of the main IB screen (block 1238). According to different embodiments, the additional information is presented in one of (i) a modified view of the IB content screen and (ii) a separate location within the IB content screen on the display of the electronic device.

According to one embodiment, a specific implementation of this processing can involve processing a voice input. This series of processes are shown as optional blocks that can extend from the main process, and includes the processor detecting a voice input while the IB content screen is open on the electronic device (optional block 1232). Processor 204 then compares the voice input with pre-established voice commands that can be utilized to control one of the IB content screen and content within the IB content screen (optional block 1234), and in response to a match of the voice input with a pre-established voice command, performing an operation corresponding to the voice command (block 1236).

Returning to decision block 1230, when the input is one that triggers opening of a new application GUI, method 1200 proceeds to block 1240 at which processor opens a new application screen/GUI to present the information that was requested from within the IB content. Processor 204 also closes the IB content screen or hides the screen until it times out (block 1242). Processor then returns the device 200 to the first operating state when the new application screen is closed on the device (block 1244). Method then terminates at end block.

Referring now to FIG. 13, wherein is illustrated a flow chart of method 1300. Method 1300 begins at start block and proceeds to block 1301 at which processor 204 executing the IBCSG module 305 receives an IB content screen generation (IBCSG) input or an IB modification input, as determined at decision block 1302. In response to receiving the IBCSG input, processor 204 opens an IB content screen template, which presents a set of user selectable or modifiable options (block 1304). Processor 204 receives at least one user modification of the user modifiable options (block 1306). Once all user modifications are received, processor 204 generates a modified IB content screen that includes the at least one user modification (block 1308). Processor then links the modified IB content screen to a target topic, which is a pre-set topic word or a user provided and inputted topic word (block 1310). The user provided or inputted topic word is received as one of the user selections or modifications, which is made to the existing topic word. Processor 204 then stores the generated modified IB content screen within a data storage of available IB content screens (block 1312) and adds the topic word within the list of trigger words (block 1314). Method then ends.

Returning to decision block 1302, if the received input is an IB content screen personalization (IBCSP) input, including a specific topic identifier, then in response to receiving the IBCSP input, processor 204 opens a settings view of an existing IB content screen with existing configuration and content data associated with the specific topic identifier (block 1324). Processor then receives at least one user modification of the existing configuration and content data (block 1326), generates a modified IB content screen that includes the at least one user modification (block 1328), and stores the generated, modified IB content screen within a data storage of available IB content screens (block 1330). In this path, no update is required of the topic word list unless the user also updates the topic word. In response to determining (at decision block 1332) that any update to (or modification of) the topic word was made, method 1300 includes replacing the previous topic word (within the list of topic words) for the particular information brief with the updated/new topic word that is applied to the modified information brief (block 1334). Method 1300 then ends.

The flow chart of FIG. 14 provides additional details about the personalization aspects of the disclosure based on specific user biometrics. Method 1400 begins at start block and proceeds to block 1402 at which processor 204 receives a first IBR input as an audible voice input of the user. At block 1404, processor 204 compares biometrics retrieved from audible voice components of the first IBR input with previously received voice biometrics data associated with one or more users, and determines at block 1406 if a match is detected. In response to detecting a match with biometric data of a particular user, processor 204 retrieves the base IB content screen (block 1408) and identifies specific information for the requested topic that is associated with the particular/identified user (block 1410). Processor 204 personalizes the IB content screen by replacing one or more default data with content specific to the particular user (block 1412 and presents the specific information within the content presented within the displayed IB content screen (block 1414). However, if no match is detected of the user biometrics, processor 204 presents the default data for the identified topic within the displayed IB content screen (block 1416). Method 1400 then ends.

It is appreciated that other means of entering biometric information of the requester can be supported in alternate embodiments. By way of example, without applying any limitations, the biometric information can be a fingerprint information where the user places his finder on a scanner associated with the device while saying the topic word. These and other variations are contemplated by and logically extend from the embodiments described herein, which present only some of the possible variations of the disclosure.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   receiving, at an electronic device, an informational brief (IB) request (IBR) input that includes an identifier of a topic and a trigger, the electronic device being powered on and being in one of an active state of operation and an inactive state with an always listening mode activated;
   in response to the device being in the inactive state when the IBR input is received:
   triggering the device to enter into the active state; turning on a backlight of a display of the electronic device; and enabling a brief generation and display functionality on the device;
   matching, by the electronic device, the topic to a corresponding information brief from among a plurality of pre-stored and formatted information briefs;
   retrieving a corresponding base information brief, the base information brief having default information corresponding to the topic, the default information presented in a pre-selected format for the base information brief;
   personalizing sections of an IB content screen of the base information brief to generate a personalized IB content screen of a personalized brief by replacing one or more sections of the default information with personalization data associated with an identified user;

updating any variable data within the personalized brief, the variable data being data that may be changing and is updatable by accessing a source for updating underlying target information;

presenting, on the display of the electronic device, the personalized IB content screen, displaying information corresponding to the topic, including the personalization data, any remaining default data, and the updated variable data;

in response to expiration of an allocated time limit: automatically closing the IB content screen; and in response to the closing of the IB content screen when the device was initially in the inactive state when the IBR input was received, triggering the backlight to turn off and returning the display and electronic device to the inactive state.

2. The method of claim 1, wherein the trigger comprises a voice command, the method further comprising:

comparing biometrics retrieved from audible voice components of the voice command with previously received voice biometrics data associated with one or more users; and in response to detecting a match with biometric data of a particular user: identifying a specific personalized information brief having specific information related to the topic and that is associated with the particular user; and presenting the personalized information brief associated with the particular user with the specific information included within the content presented within the IB content screen.

3. The method of claim 2, further comprising:

in response to detecting the match, performing one of:

personalizing the IB content screen by replacing one or more default data and brief template with content specific to the particular user, utilizing a user-selected format and location of content within the information brief, the content specific to the particular user including pseudo-static categories of content, including selected content that the particular user has pre-selected for display in the user-selected format and location within the information brief;

partially-personalizing the IB content screen, where a layout and types of content are pre-determined for presentation within a pre-formatted brief template and content specific to the particular user are pre-selected by the particular user and presented within the IB content screen using the pre-formatted brief template; and in response to not detecting a match, presenting default data within the IB content screen using the default data and pre-formatted brief template.

4. The method of claim 1, further comprising:

receiving one of a second input and a third input while the IB content screen is open on a display of the device;

in response to receiving the second input while the IB content screen is open, extending a time period during which the IB content screen remains open on the display of the device, wherein the second input comprises at least one of (i) a voice command, (ii) a manual selection on the electronic device, and (iii) a gesture detected in proximity to the electronic device; and in response to receiving the third input while the IB content screen is open, automatically closing the IB content screen, wherein the IB content screen is closed before expiration of the time period, wherein the third input comprises at least one of (i) a voice command, (ii) a manual selection on the electronic device, and (iii) a gesture detected in proximity to the electronic device.

5. The method of claim 1, further comprising:

receiving a fourth input while the IB content screen is open on a display of the device; and in response to receiving the fourth input while the IB content screen is open, retrieving and presenting additional information about a specific item within the IB content screen;

wherein the fourth input comprises at least one of (i) a voice command, (ii) a manual selection on the electronic device, and (iii) a gesture detected in proximity to the electronic device.

6. The method of claim 5, wherein the specific item is a selectable item presented within the IB content screen, and the method further comprises:

detecting selection of the specific item while the IB content screen is open; and temporarily presenting the additional information along with the IB content screen;

wherein the additional information is presented in one of (i) a modified view of the IB content screen and (ii) a separate location on the display of the electronic device.

7. The method of claim 1, further comprising:

detecting a voice input while the IB content screen is open on the electronic device;

comparing the voice input with pre-established voice commands that can be utilized to control one of the IB content screen and content within the IB content screen; and in response to a match of the voice input with a pre-established voice command, performing an operation corresponding to the pre-established voice command.

8. The method of claim 1, further comprising:

receiving an IB content screen generation (IBCSG) input;

in response to receiving the IBCSG input:

opening a IB content screen template with user modifiable options;

receiving at least one user modification of the user modifiable options;

generating a modified IB content screen that includes the at least one user modification;

linking the modified IB content screen to a target topic; and storing the generated modified IB content screen within a data storage of available IB content screens.

9. The method of claim 1, further comprising:

receiving an IB content screen personalization (IBCSP) input including a specific topic identifier;

in response to receiving the IBCSP input:

opening an existing IB content screen with existing configuration and content data associated with the specific topic identifier;

receiving at least one user modification of the existing configuration and content data;

generating a modified IB content screen that includes the at least one user modification; and storing the generated, modified IB content screen within a data storage of available IB content screens.

10. The method of claim 1, wherein:

the information brief is a contextual brief that utilizes location as contextual information for updating the underlying target information;

the variable data requires a level of localization and a template of the information brief is automatically filled in by collecting contextual information about the location; and updating of the variable data within the information brief comprises updating pertinent information from a corresponding source so that a correctness of automatically generated base content can be confirmed.

11. The method of claim 1, further comprising:

monitoring an elapsed presentation time for the IB content screen on the electronic device; and comparing the elapsed presentation time against a time limit allocated for presenting the IB content screen to determine the expiration of the time limit; and wherein the IBR input is received while the electronic device is in a first operating state and the method comprises automatically returning the electronic device to the first operating state contemporaneously with the closing of the content screen; and wherein, the brief's screen is displayed for only a predetermined period of time corresponding to the time limit, and a previous screen and operating state of the device is automatically returned to without further user action.

12. The method of claim 1, wherein:

the predetermined period of time is configurable by the user within the brief's settings screen; and a time for displaying each brief is variable depending on a type of information that is being presented by the particular brief screen, such that a first brief containing first content can be automatically times to display for a longer time than a second brief containing second content.

13. The method of claim 1, wherein when there are a number of pages available for selection within a single brief, an on-screen display time of the brief includes a pre-assigned extension of additional time for each page selection that is detected while a previous page of the brief is still being displayed before the brief is closed.

14. A device comprising:

a memory having stored thereon an information brief (IB) generation utility (BGU) that enables generation and management of at least one IB content screen;

at least one input mechanism that receives an IB request (IBR) input that includes an identifier of a topic and a trigger;

a display that provides visual output of at least one graphical user interface (GUI) when the electronic device is in an operating state and which is configurable to display IB content screens, the electronic device being powered on and being in one of the operating state and an inactive state with an always listening mode activated; and a processor that is communicatively coupled to the memory, the at least one input mechanism, and the display, and which executes code of the BGU, wherein the processor:

in response to receipt of the IBR input:

in response to the device being in the inactive state when the IBR input is received: triggers the device to enter into the active state; turns on a backlight of a display of the electronic device; and enables a brief generation and display functionality on the device;

matches, by the electronic device, the topic to a corresponding information brief from among a plurality of pre-stored and formatted information briefs;

retrieves a corresponding base information brief, the corresponding base information brief having default information corresponding to the topic, the default information presented in a pre-selected format for the information brief selected from among multiple available formats during setup of the information brief;

personalizes sections of an IB content screen of the base information brief to generate a personalized IB content screen of a personalized brief by replacing one or more of the default information with personalization data associated with an identified user;

updates any variable data within the IB content screen, the variable data being data that may be changing and is updatable by accessing a source for updating underlying target information to generate updated variable data;

configures the display to present the personalized IB content screen, the personalized IB content screen displaying information corresponding to the topic and including the personalization data, any remaining default data, and the updated variable data, presented in the pre-selected format;

monitors an elapsed presentation time for the IB content screen on the electronic device;

compares the elapsed presentation time against a time limit allocated for presenting the IB content screen;

in response to expiration of the time limit, closes the IB content screen; and in response to closing the IB content screen when the device was initially in the inactive state when the IBR input was received: automatically triggers the backlight to turn off and returns the display and electronic device to the inactive state.

15. The device of claim 14, wherein the at least one input mechanism comprises a microphone, and the IBR input comprises a voice command that is audibly received via the microphone and forwarded to the processor for voice analysis, wherein to identify the user that submitted the IBR input, the processor:

compares biometrics retrieved from audible voice components of the voice command with previously received voice biometrics data associated with one or more users; and in response to detecting a match with biometric data of a particular user: identifies a specific personalized information brief having specific information related to the topic and that is associated with the particular user; and presents the personalized information brief associated with the particular user with the specific information included within the content presented within the IB content screen.

16. The device of claim 14, further comprising:

at least one of firmware and an application that executes on the processor to generate a graphical user interface that is presented on the display when the device is in an active state, the at least one firmware comprising a power saving module that is executed by the processor to place the electronic device in the inactive state in which a backlight of the display screen is off, such that the device is not currently displaying any user interfaces on the display;

wherein the processor:

identifies a current operational state of the electronic device from among (i) an active state in which one of a home screen GUI and an application user interface is presented on the display; and (ii) the inactive state; and in response to the device being in the active state when the IBR input is received: opens the IB content screen to overlay the display; and returns the display to the active state when the IB content screen is closed.

17. The device of claim 14, wherein:

in response to detecting the match, the processor further performs one of:

personalizes the IB content screen by replacing one or more default data and brief template with content specific to the particular user, utilizing a user-selected format and location of content within the information brief, the content specific to the particular user including pseudo-static categories of content, including selected content that the particular user has pre-selected for display in the user-selected format and location within the information brief; and partially-personalizes the IB content screen, where a layout and types of content are pre-determined for presentation within a pre-formatted brief template and content specific to the particular user are pre-selected by the particular user and presented within the IB content screen using the pre-formatted brief template; and in response to not detecting a match, the processor presents default data within the IB content screen using the default data and pre-formatted brief template.

18. A computer program product comprising:

a non-transitory computer readable storage medium; and program code on the non-transitory computer readable storage medium that when executed by a processor of an electronic device having at least one input device, a storage, and an output device, causes the processor to implement functions of:

receiving, at the electronic device via the at least one input device, an informational brief (IB) request (IBR) input that includes an identifier of a topic and a trigger, the electronic device being powered on and being in one of an active state of operation and an inactive state with an always listening mode activated; and in response to receipt of the IB input:

in response to the device being in the inactive state when the IBR input is received: triggering the device to enter into the active state; turning on a backlight of a display of the electronic device; and enabling a brief generation and display functionality on the device;

matching, by the electronic device, the topic to a corresponding information brief from among a plurality of pre-stored and formatted information briefs;

retrieving a corresponding base information brief, the base information brief having default information corresponding to the topic, the default information presented in a pre-selected format for the information brief selected from among multiple available formats during setup of the information brief;

personalizing sections of an IB content screen of the base information brief to generate a personalized IB content screen of a personalized brief by replacing one or more of the default information with personalization data associated with an identified user;

updating any variable data within the IB content screen, the variable data being data that may be changing and is updatable by accessing a source for updating underlying target information to generate updated variable data; and presenting, on the display of the electronic device, the personalized IB content screen displaying information corresponding to the topic, including the personalization data, any remaining default data, and the updated variable data, presented in the pre-selected format;

monitoring an elapsed presentation time for the IB content screen on the electronic device;

comparing the elapsed presentation time against a time limit allocated for presenting the IB content screen;

in response to expiration of the time limit, closing the IB content screen; and in response to closing the IB content screen when the device was initially in the inactive state when the IBR input was received: automatically triggering the backlight to turn off and returning the display and electronic device to the inactive state in response to the IB content screen being closed following the presenting.

19. The computer program product of claim 18, wherein the program code for identifying the user that submitted the IBR input comprises code for:

comparing biometrics retrieved from audible voice components of the IBR input with previously received voice biometrics data associated with one or more users;

in response to detecting a match with biometric data of a particular user: identifying a specific personalized information brief having specific information related to the topic and that is associated with the particular user; personalizing the IB content screen by replacing one or more default data with content specific to the particular user; and presenting the personalized information brief associated with the particular user with the specific information included within the content presented within the IB content screen; and in response to not detecting a match, presenting the default data within the IB content screen.

20. The computer program product of claim 18, wherein the program code further comprises code for:

detecting, from the IBR input, a match with biometric data of a particular user:

in response to detecting the match, performing one of:

personalizing the IB content screen by replacing one or more default data and brief template with content specific to the particular user, utilizing a user-selected format and location of content within the information brief, the content specific to the particular user including pseudo-static categories of content, including selected content that the particular user has pre-selected for display in the user-selected format and location within the information brief;

partially-personalizing the IB content screen, where a layout and types of content are pre-determined for presentation within a pre-formatted brief template and content specific to the particular user are pre-selected by the particular user and presented within the IB content screen using the pre-formatted brief template; and in response to not detecting a match, presenting default data within the IB content screen using the default data and pre-formatted brief template.

\* \* \* \* \*